United States Patent
Lee et al.

(10) Patent No.: US 10,485,013 B2
(45) Date of Patent: Nov. 19, 2019

(54) V2X MESSAGE TRANSMISSION METHOD PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hyukjin Chae, Seoul (KR); Youngtae Kim, Seoul (KR); Kijun Kim, Seoul (KR); Hanbyul Seo, Seoul (KR); Hanjun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 2 days.

(21) Appl. No.: 15/737,969

(22) PCT Filed: Jun. 20, 2016

(86) PCT No.: PCT/KR2016/006543
§ 371 (c)(1),
(2) Date: Dec. 19, 2017

(87) PCT Pub. No.: WO2016/204592
PCT Pub. Date: Dec. 22, 2016

(65) Prior Publication Data
US 2018/0332602 A1     Nov. 15, 2018

Related U.S. Application Data

(60) Provisional application No. 62/182,268, filed on Jun. 19, 2015.

(51) Int. Cl.
*H04J 3/16*     (2006.01)
*H04W 72/12*    (2009.01)
(Continued)

(52) U.S. Cl.
CPC ....... *H04W 72/1242* (2013.01); *H04L 5/0094* (2013.01); *H04W 4/40* (2018.02);
(Continued)

(58) Field of Classification Search
USPC .... 370/229, 230, 230.1, 252, 314, 321, 326, 370/330, 336, 337, 345, 347, 395.4,
(Continued)

(56) References Cited

U.S. PATENT DOCUMENTS 8,520,695 B1* 8/2013 Rubin ............... G08G 9/02
                                                370/445
9,363,827 B2* 6/2016 Li .................. H04W 76/14
(Continued)

FOREIGN PATENT DOCUMENTS

WO     WO 2014/065563 A1     5/2014

OTHER PUBLICATIONS

3GPP TS 36.211 V8.5.0 (Dec. 2008); 3rd Generation Partnership Project; Technical Specification Group Radio Access Network; Evolved Universal Terrestrial Radio Access (E-UTRA); Physical Channels and Modulation (Release 8); Total 82 pages.
(Continued)

*Primary Examiner* — Kwang B Yao
*Assistant Examiner* — Nguyen H Ngo
(74) *Attorney, Agent, or Firm* — Birch, Stewart, Kolasch & Birch, LLP

(57) ABSTRACT

The present invention relates to a Vehicle-to-X (V2X) communication method performed by a terminal in a wireless communication system. The method comprises: determining priority of information related to the V2X communication; selecting a transmission time interval (TTI) on the basis of the priority; and transmitting the information on the basis of the selected TTI. If the information related to the V2X communication is information having high priority, a first
(Continued)

TTI is selected, and if the information related to the V2X communication is information having relatively lower priority than the information having high priority, a second TTI is selected.

11 Claims, 30 Drawing Sheets

(51) Int. Cl.
| | |
|---|---|
| *H04W 72/10* | (2009.01) |
| *H04L 5/00* | (2006.01) |
| *H04W 4/90* | (2018.01) |
| *H04W 4/44* | (2018.01) |
| *H04W 4/40* | (2018.01) |
| *H04W 72/02* | (2009.01) |
| *H04W 72/04* | (2009.01) |
| *H04L 27/26* | (2006.01) |

(52) U.S. Cl.
CPC ............... *H04W 4/44* (2018.02); *H04W 4/90* (2018.02); *H04W 72/02* (2013.01); *H04W 72/0406* (2013.01); *H04W 72/10* (2013.01); *H04L 5/0044* (2013.01); *H04L 5/0053* (2013.01); *H04L 27/2602* (2013.01); *H04L 27/2636* (2013.01); *H04W 72/0446* (2013.01)

(58) Field of Classification Search
USPC .............................. 370/395.42, 376, 458, 468
See application file for complete search history.

(56) References Cited

U.S. PATENT DOCUMENTS

| | | | |
|---|---|---|---|
| 9,763,248 | B2 | 9/2017 | Kim et al. |
| 2007/0047485 | A1* | 3/2007 | Gorokhov ......... H04W 72/1231 370/329 |
| 2007/0201404 | A1* | 8/2007 | Cheon .................... H04L 47/10 370/331 |
| 2013/0083679 | A1 | 4/2013 | Krishnaswamy et al. |
| 2013/0279491 | A1* | 10/2013 | Rubin .................... G08G 1/166 370/347 |
| 2014/0169433 | A1 | 6/2014 | Hadani et al. |
| 2014/0244104 | A1 | 8/2014 | Tan |
| 2016/0128076 | A1* | 5/2016 | Langereis ............. H04L 1/0009 370/336 |
| 2016/0242223 | A1* | 8/2016 | Brahmi ............... H04W 28/021 |
| 2017/0251486 | A1* | 8/2017 | Hu .................... H04W 72/1242 |
| 2017/0290008 | A1* | 10/2017 | Tooher ................. H04L 1/0007 |
| 2017/0325214 | A1* | 11/2017 | Lu ........................ H04W 76/14 |

OTHER PUBLICATIONS

LG Electronics Inc., "V2V/V2I communication", S1-151103, 3GPP TSG-SA WG1 Meeting #70, Los Cabos, Mexico, Apr. 13-17, 2015, See pp. 1-3.

Samsung, "Priority handling for D2D communication", R1-151615, 3GPP TSG RAN WG1 Meeting #80bis, Belgrade, Serbia, Apr. 20-24, 2015, See pp. 1-3.

* cited by examiner

V2X MESSAGE TRANSMISSION METHOD PERFORMED BY TERMINAL IN WIRELESS COMMUNICATION SYSTEM, AND TERMINAL USING SAME

CROSS REFERENCE TO RELATED APPLICATIONS

This application is the National Phase of PCT International Application No. PCT/KR2016/006543, filed on Jun. 20, 2016, which claims priority under 35 U.S.C. 119(e) to U.S. Provisional Application No. 62/182,268, filed on Jun. 19, 2015, all of which are hereby expressly incorporated by reference into the present application.

BACKGROUND OF THE INVENTION

Field of the Invention

The present invention relates to wireless communication, and more particularly, to a vehicle-to-X (V2X) message transmission method performed by a terminal in a wireless communication system, and a terminal using the same.

Related Art

The International Telecommunication Union Radio Communication Sector (ITU-R) is conducting a standardization operation of International Mobile Telecommunication (IMT)-Advanced which is a next-generation mobile communication system after 3rd generation. The IMT-Advanced aims to support IP (Internet Protocol) based multimedia service at data rate of 1 Gbps in stationary and low-speed moving states and 100 Mbps in a high-speed moving state.

The 3rd Generation Partnership Project (3GPP) as a system standard that meets the requirements of the IMT-Advanced prepares for LTE-Advanced (LTE-A) created by improving Long Term Evolution (LTE) based on Orthogonal Frequency Division Multiple Access (OFDMA)/Single Carrier-Frequency Division Multiple Access (SC-FDMA). The LTE-A is one of the strong candidates for the IMT-Advanced.

In recent years, there has been a growing interest in device-to device (D2D) technology for direct communication between devices. In particular, the D2D has attracted attention as communication technology for a public safety network.

Vehicle-to-X (V2X) is a technology that exchanging useful information such as traffic conditions by continuously mutually communicating with a road infrastructure or other vehicles while vehicles travel by adding mobility to the D2D technology. In V2X networking, for example, in Vehicle-to-X (V2X), 'X' represents person (or UE) (V2P), vehicle (V2V), (UE type or eNB type) road side unit (RSU) or infrastructure (V2I).

The fact that UE, that is, V2X UE performs wireless communication at a high speed means that the UE may be strongly influenced by a Doppler effect. For example, due to a velocity of the V2X UE, the Doppler effect such as a channel shift in a time axis may occur and as the velocity increases, the channel shift effect in the time axis may be larger.

Accordingly, the present invention provides a method for transmitting reliable information and an apparatus using the same, even though the V2X UE is affected by the Doppler effect, or the like through a TTI (or a subframe) structure robust to the Doppler effect, or the like.

SUMMARY OF THE INVENTION

The present invention provides a method for a D2D operation performed by a UE in a wireless communication system and a UE using the same.

In an aspect, a vehicle-to-X (V2X) communication method performed by a UE in a wireless communication system is provided. The method may comprise determining priority of information related to the V2X communication, selecting a transmission time interval (TTI) on the basis of the priority and transmitting the information on the basis of the selected TTL. If the information related to the V2X communication is information having high priority, a first TTI may be selected, and if the information related to the V2X communication is information having relatively lower priority than the information having high priority, a second TTI may be selected.

A resource element (RE) of the first TTI may be longer than the resource element of the second TTI in terms of a frequency.

The resource element of the first TTI may be shorter than the resource element of the second TTI in terms of a time.

The resource element of the first TTI may be K times longer than the resource element of the second TTI in terms of the frequency and the resource element of the first TTI is 1/K times shorter than the resource element of the second TTI in terms of the time, and the K is a positive integer other than 0.

Data may be repeatedly allocated to the resource element of the first TTI.

Zero or null may be allocated to a specific subcarrier in a frequency domain of the first TTI.

The specific subcarrier to which the zero or null is allocated may be positioned alternatively with a subcarrier to which information is allocated in the frequency domain.

The resource element (RE) of the first TTI may be longer than the resource element of the second TTI in terms of the frequency.

The resource element of the first TTI may be shorter than the resource element of the second TTI in terms of the time.

A guard area may be positioned between the first TTI and the second TTI.

The guard area may be positioned on the frequency domain between the first TTI and the second TTI.

The information having the high priority may be control information, and the information having the low priority may be data information.

Information regarding a configuration of the at least one TTI may be preconfigured in the UE.

In another aspect, a UE is provided. The UE may comprise a radio frequency (RF) unit transmitting and receiving a radio signal, and a processor operated in association with the RF unit. The processor may determines priority of information related to V2X communication, selects a transmission time interval (TTI) on the basis of the priority, and transmits the information on the basis of the selected TTL. If the information related to the V2X communication is information having high priority, a first TTI may be selected, and if the information related to the V2X communication is information having relatively lower priority than the information having high priority, a second TTI may be selected.

According to the present invention, a UE can use a TTI constituted by a resource element which is a shorter length in a time axis and a longer length in a frequency axis than a resource element (RE) in the related art. In this case, since the resource element in the TTI has the short length in the time axis, there is almost no channel variation when the UE sends one symbol. Accordingly, the TTI has robustness against the Doppler effect, and the UE under a fast moving situation performs wireless communication using the TTI less affected by the Doppler effect, thereby improving reliability of data transmission and reception.

Further, according to the present invention, the UE uses the TTI having robustness against the Doppler effect when transmitting information to be highly reliable and provides a method using a general TTI when transmitting information of which only reliability may be guaranteed to perform adaptive wireless communication.

DESCRIPTION OF EXEMPLARY EMBODIMENTS

Figure 1:
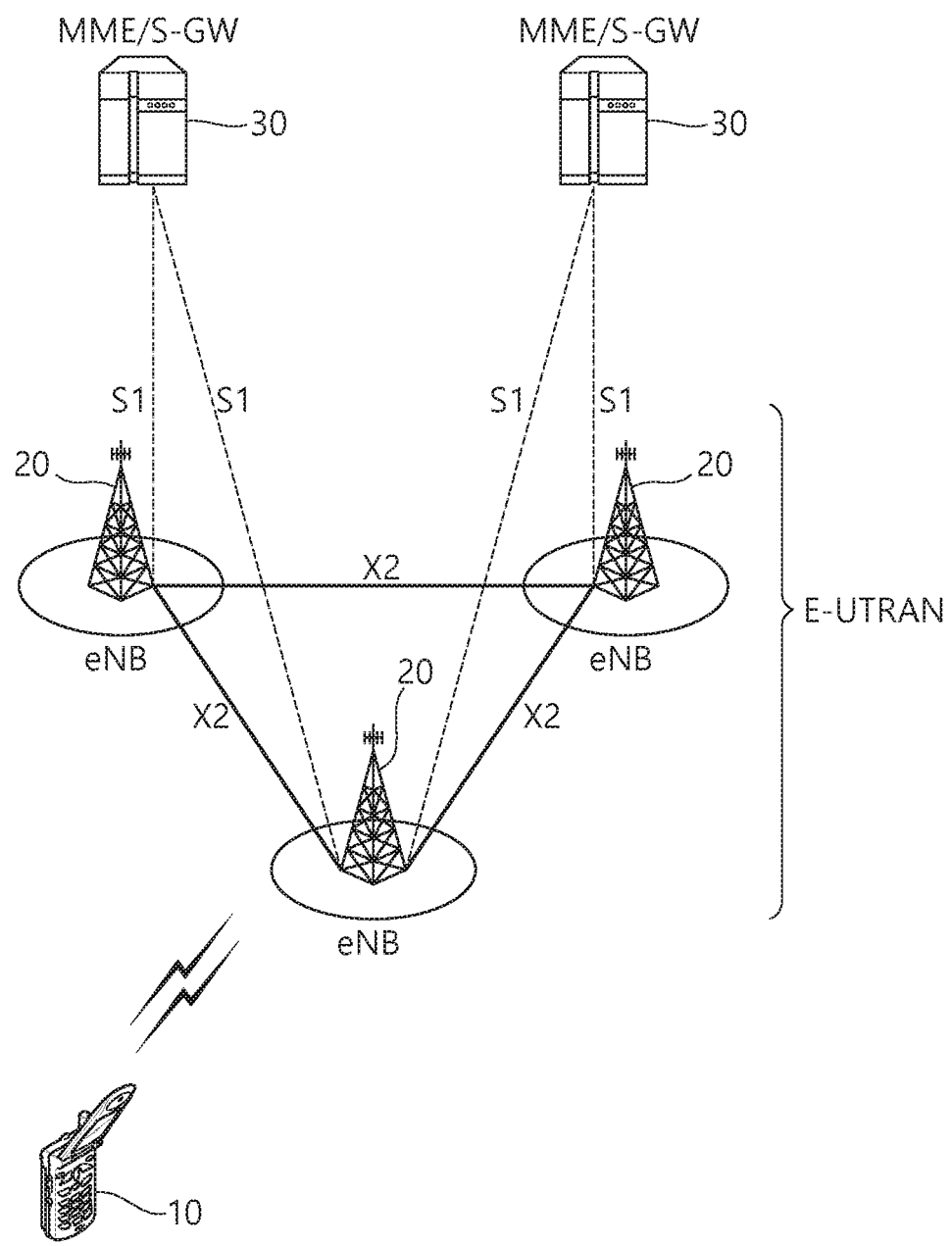
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
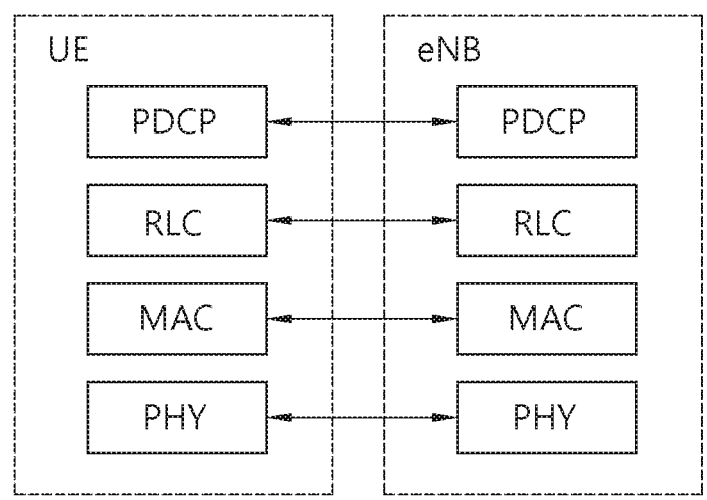
FIG. 2 is a diagram showing a wireless protocol architecture for a user plane.
Figure 3:
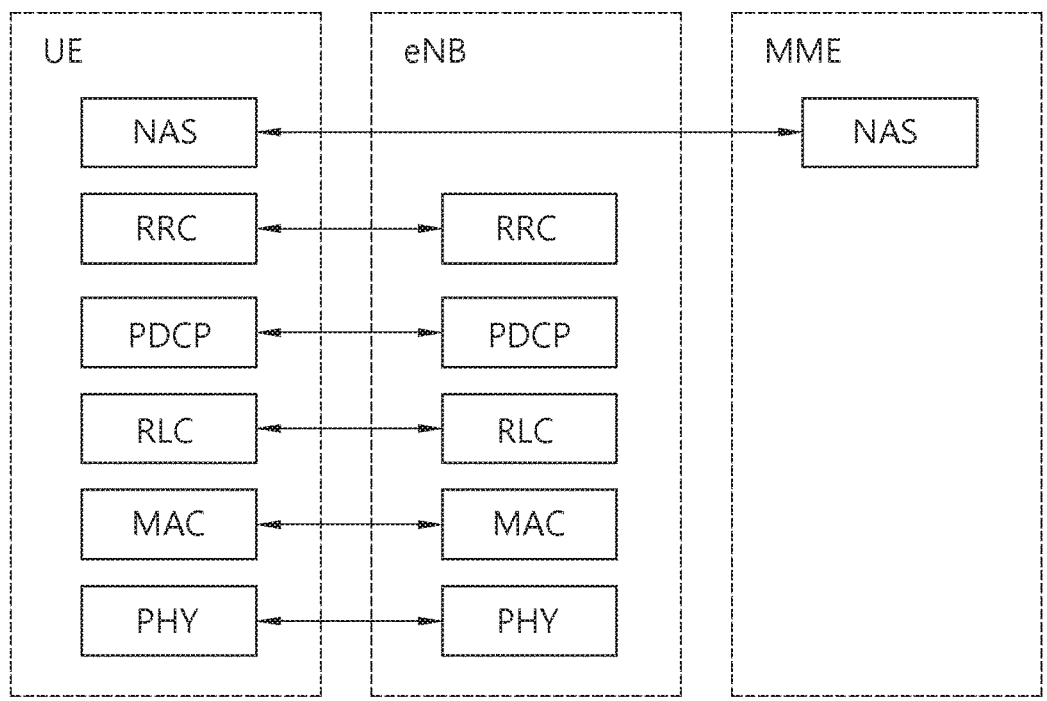
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
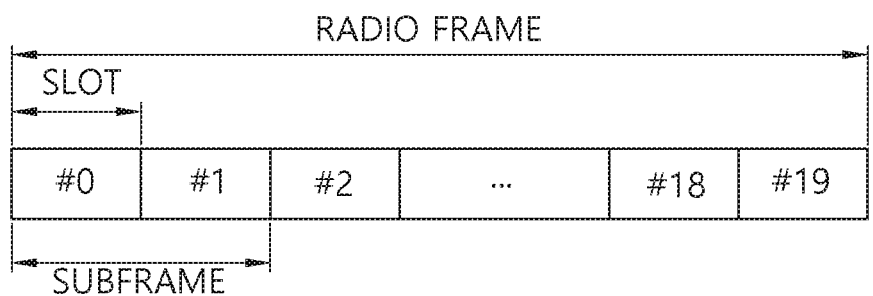
FIG. 4 illustrates a radio frame structure of 3GPP LTE.

FIG. 4 illustrates a radio frame structure of 3GPP LTE.

Referring to FIG. 4, a radio frame is constituted by 10 subframes and one subframe is constituted by two slots. As one example, a length of one subframe may be 1 ms and the length of one slot may be 0.5 ms. A time required for transmitting one subframe is referred to as a transmission time interval (TTI). The TTI may be a minimum unit of scheduling. The structure of the radio frame is merely an example and the number of subframes included in the radio frame and the number of slots included in the subframe may be variously changed.

Figure 5:
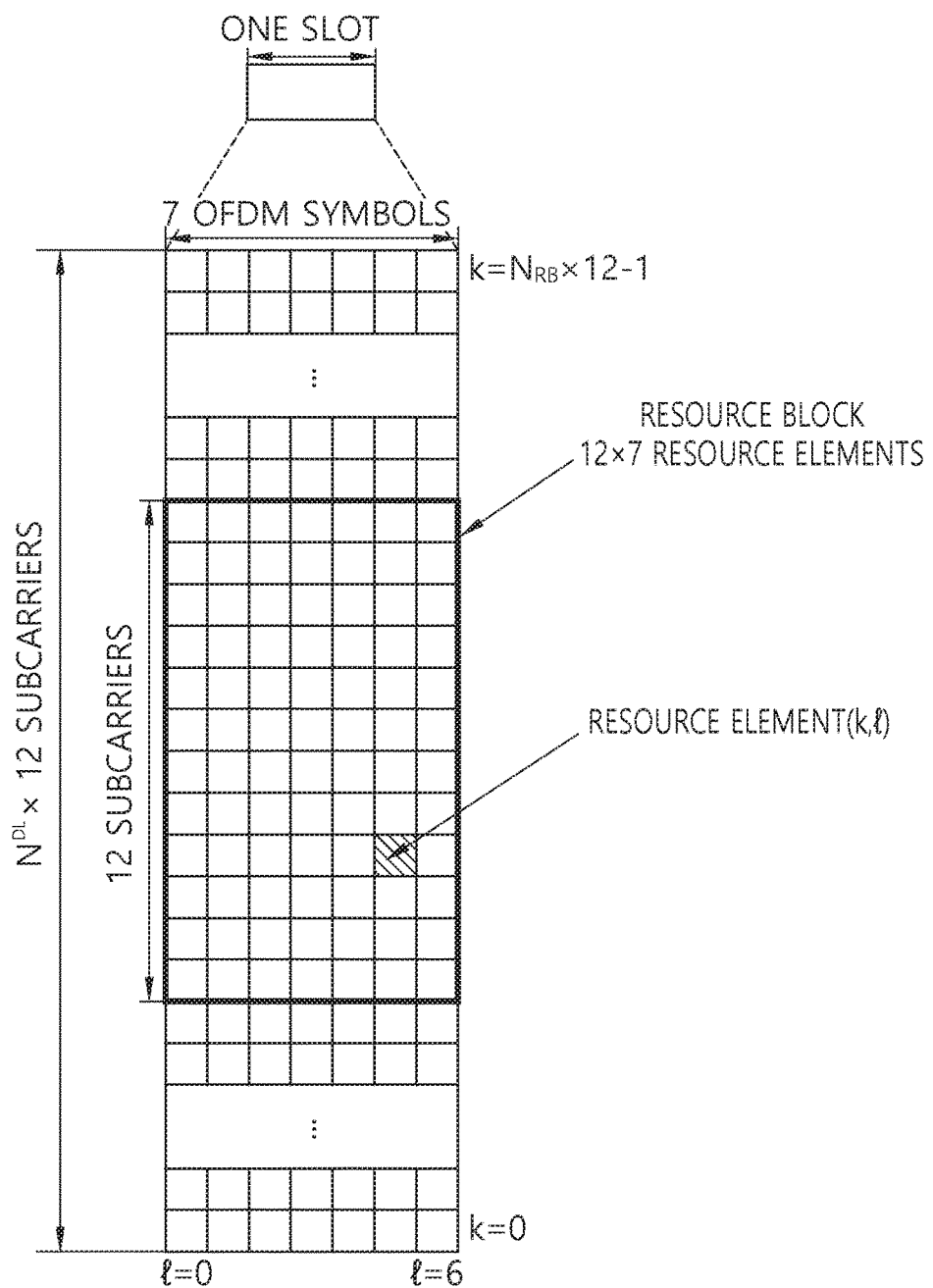
FIG. 5 is an exemplary diagram illustrating a resource grid for one downlink slot.

FIG. 5 is an exemplary diagram illustrating a resource grid for one downlink slot.

One slot in the radio frame includes a plurality of orthogonal frequency division multiplexing (OFDM) symbols in a time domain. The OFDM symbol is used to represent one symbol period because 3GPP LTE uses OFDMA in a downlink and may be referred to as another name depending on a multiple access scheme. For example, when SC-FDMA is used, the OFDM symbol may be referred to as an SC-FDMA symbol. It is exemplarily described that one slot includes 7 OFDM symbols, but the number of OFDM symbols included in one slot may be changed according to the length of a cyclic prefix (CP). According to 3GPP TS 36.211 V8.5.0 (2008-12), one subframe in a normal CP includes 7 OFDM symbols and one subframe in an extended CP includes 6 OFDM symbols.

In addition, one slot includes a plurality of resource blocks (RBs) in a frequency domain. A resource block includes a plurality of consecutive subcarriers in one slot as a resource allocation unit. In the resource block, the subcarrier may have an interval of 15 KHz, for example.

Each element on the resource grid is referred to as a resource element (RE) and one resource block includes 12×7 resource elements. The number of resource blocks, $N_{DL}$ included in a downlink slot depends on a downlink transmission bandwidth set in a cell. The resource grid described in FIG. 5 may be applied even in an uplink.

Figure 6:
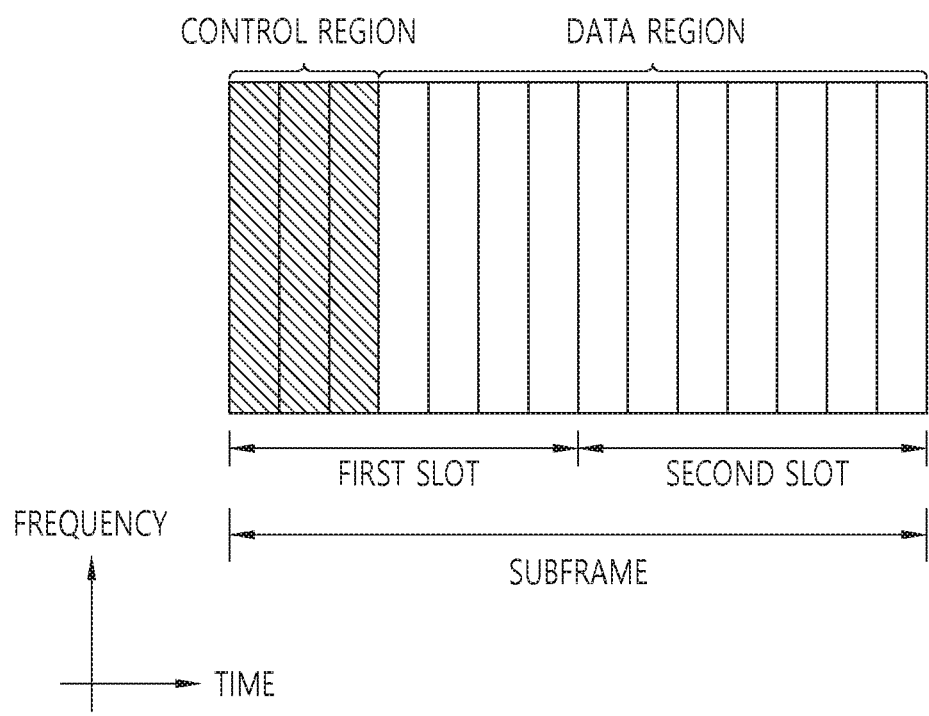
FIG. 6 illustrates a structure of a downlink subframe.

FIG. 6 illustrates a structure of a downlink subframe.

Referring to FIG. 6, the subframe includes two consecutive slots. A former maximum of 3 OFDM symbols of a first slot in the subframe are control regions to which control channels are allocated and the remaining OFDM symbols are data regions to which a data channel is allocated. The control region may be constituted by a maximum of 4 OFDM symbols according to a system band.

The control channels allocated to the control region include a physical control format indication channel (PCFICH), a physical hybrid-ARQ indicator channel (PHICH), and a physical downlink control channel (PDCCH). The PCFICH is a control channel through which information indicating the size of the control region, that is, the number of OFDM symbols constituting the control region is transmitted. The PHICH is a control channel for carrying acknowledgment/not-acknowledgment (ACK/NACK) for uplink data transmission of the UE. The PDCCH may carry resource allocation (also referred to as a downlink (DL) grant) and a transmission format of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. Control information transmitted through the PDCCH is referred to as downlink control information (DCI).

DCI formats include format 1 for physical uplink shared channel (PUSCH) scheduling, format 1 for scheduling one PDSCH codeword, format 1A for compact scheduling of one PDSCH codeword, format 1B for compact scheduling for rank-1 transmission of a single codeword in a spatial multiplexing mode, format 1C for very compact scheduling of the downlink shared channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, format 3 for transmitting a 2-bit power control transmission power control TPC) command for the PUCCH and the PUSCH, and format 3A transmitting a 1-bit power control TPC command of the PUCCH and the PUSCH.

Figure 7:
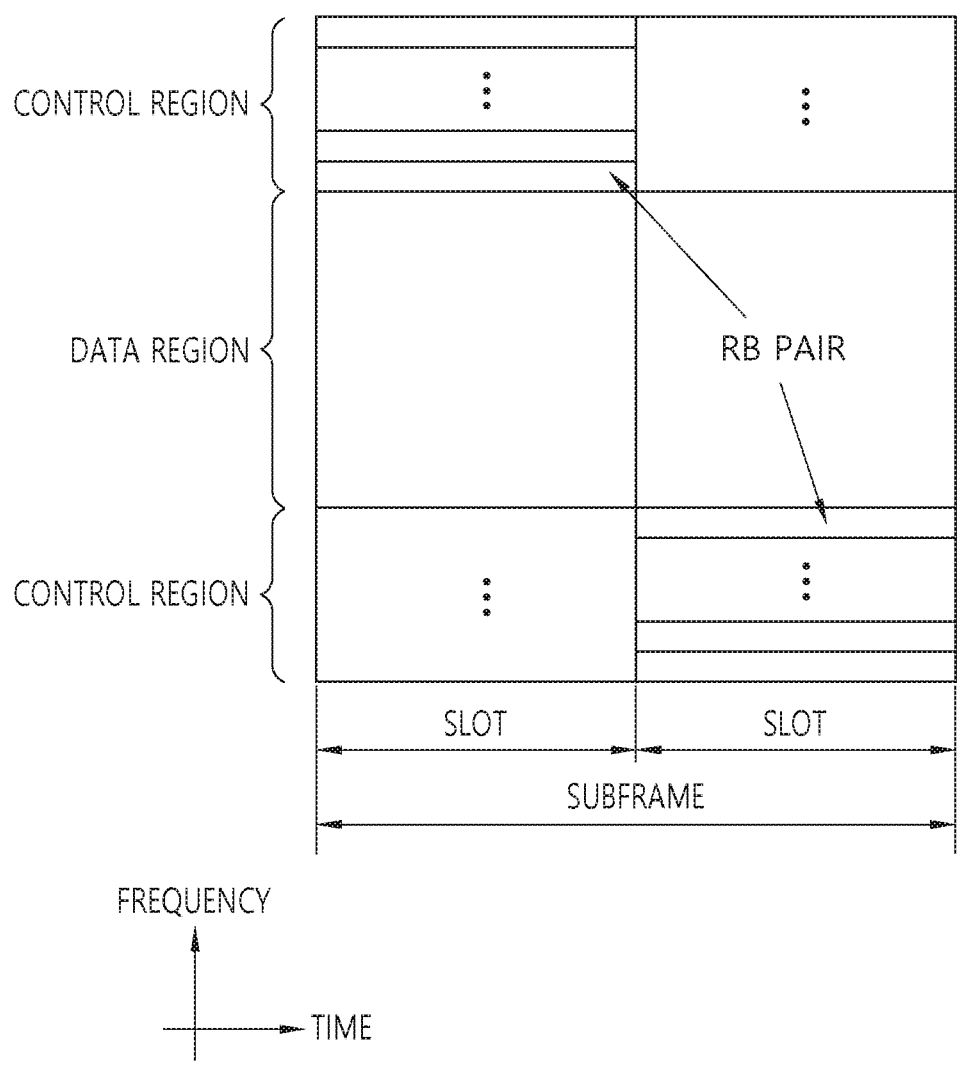
FIG. 7 illustrates the structure of an uplink subframe.

FIG. 7 illustrates the structure of an uplink subframe.

Referring to FIG. 7, the uplink subframe may be divided into a control region to which the physical uplink control channel (PUCCH) for carrying uplink control information is allocated and a data region to which the physical uplink shared channel (PUSCH) for carrying user data is allocated in a frequency domain.

The PUCCH for one UE is allocated to a pair of resource blocks (RBs) and the RBs which belong to the pair of RBs occupy different subcarriers in two slots, respectively. In this case, the pair of RBs allocated to the PUCCH frequency-hop in a slot boundary.

Hereinafter, the OFDM will be described.

Figure 8:
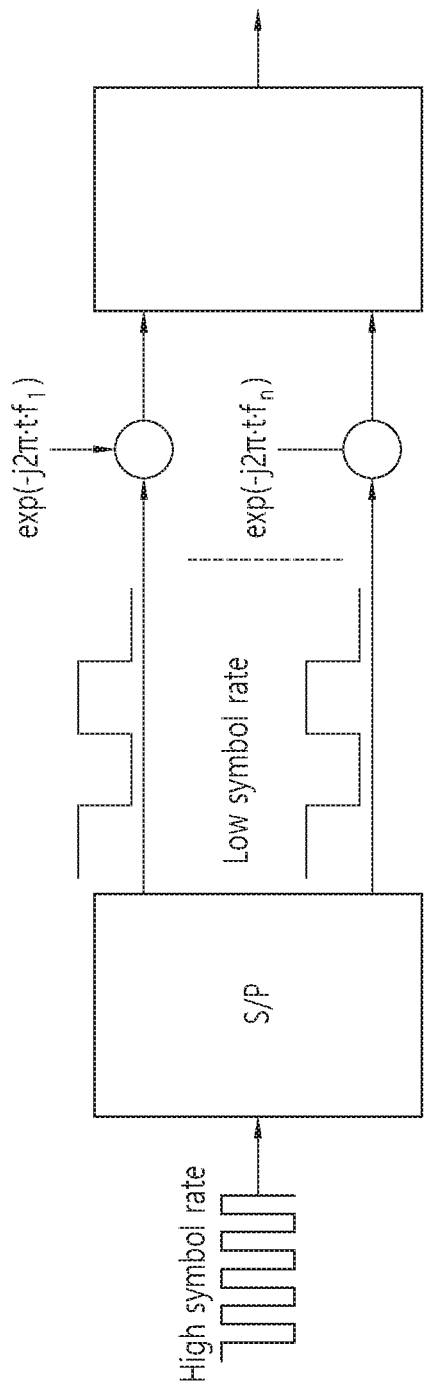
FIG. 8 schematically illustrates a serial-to-parallel conversion operation for OFDM.

FIG. 8 schematically illustrates a serial-to-parallel conversion operation for OFDM.

According to FIG. 8, a high rate data stream may be input to a serial-to-parallel conversion unit. In general, in the case where the high rate data stream is serially transmitted, a problem may occur when a symbol period Ts is smaller than channel delay spread Td. This generates intersymbol interference (ISI) corresponding to undone by a complex equalization procedure. In general, the equalization complexity increases as large as a square of a channel impulse response length.

As illustrated in FIG. 8, the high rate stream of a data symbol in the OFDM is serial-to-parallel converted to M parallel subcarriers for modulation. Herein, a symbol duration on each subcarrier is increased by a factor corresponding to M. This is still larger than the channel delay spread.

Under the assumption that a time variation channel impulse response remains constant during transmission of each modulated OFDM symbol, the above operation has a significant meaning for less complexity equalization in a receiver.

Figure 9:
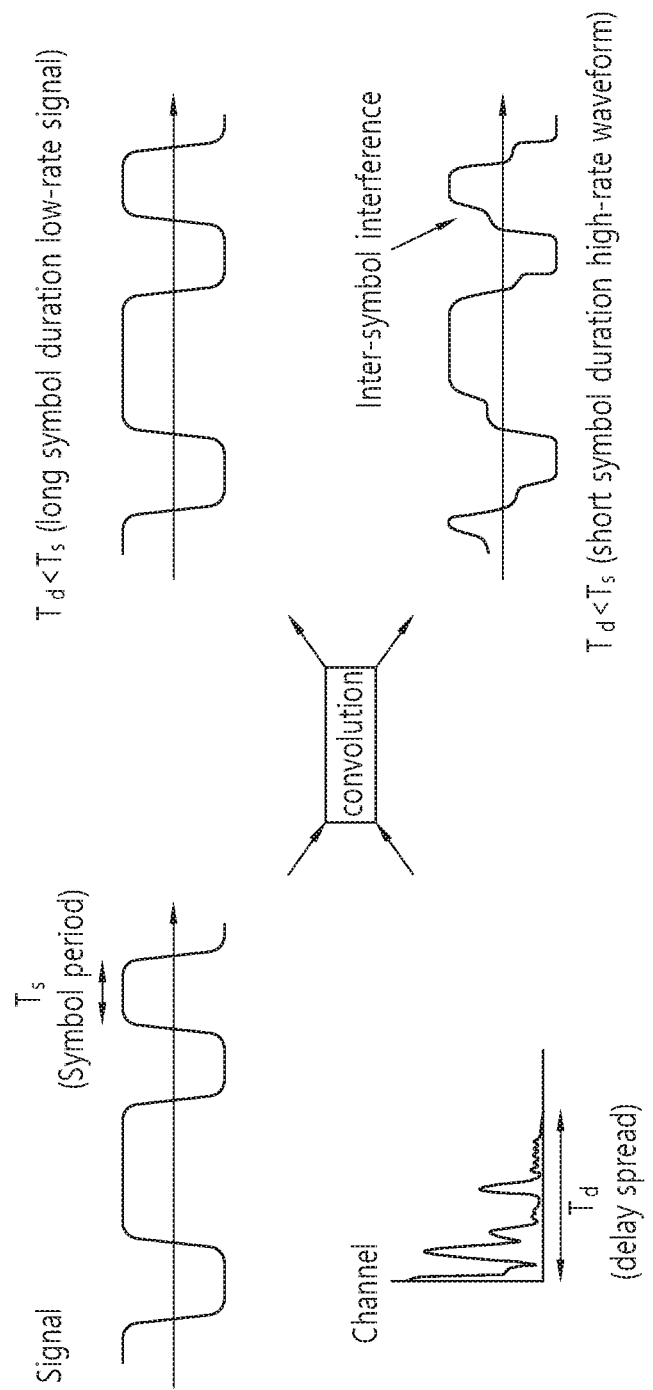
FIG. 9 schematically illustrates a channel effect on a signal having short and long symbol duration.

FIG. 9 schematically illustrates a channel effect on a signal having short and long symbol duration.

Referring to FIG. 9, a signal having a symbol period of Ts and a channel having delay spread of Td may be convoluted.

As can be known with reference to FIG. 9, it is assumed that a signal having an OFDM symbol period Ts is transmitted. In this case, assuming that the signal undergoes a channel environment having delay spread of Td, the signal is convolved with the signal and the channel environment. In this case, in FIG. 9, a result of the long symbol duration substantially unaffected by the ISI is compared with the short symbol duration ad in this case, the short symbol duration is strongly influenced by the ISI. That is, the case of Td<Ts is less influenced by the ISI than the case of Td>Ts.

That is, when Td<Ts, then the symbol period is only a little longer. However, when Td>Ts, the intersymbol interference (ISI) occurs. In order to remove such ISI, it is desirable to provide a guard interval at a start position of each OFDM symbol. A cyclic prefix (CP) may be needed to set the guard interval. CP insertion is achieved by redundantly inserting samples positioned in a last part of each OFDM symbol into a front part of the symbol. With respect to the length of the CP, a normal CP and an extended CP are defined in the 3GPP LTE.

Figure 10:
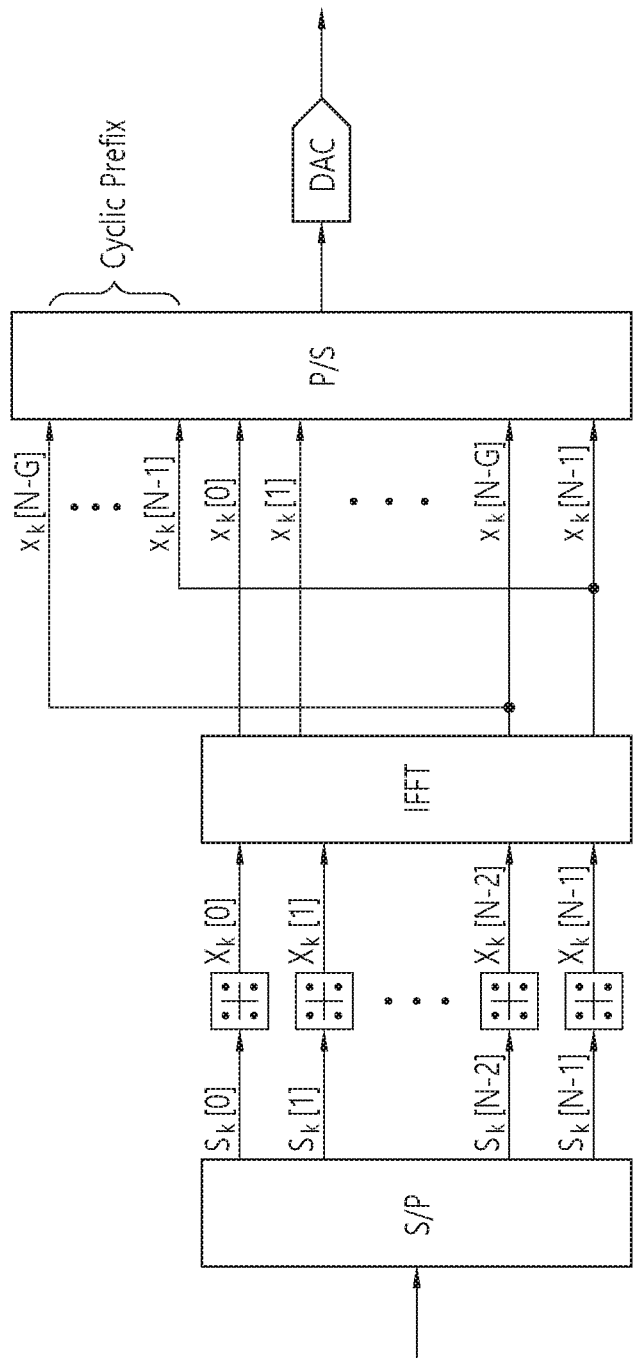
FIGS. 10 and 11 schematically illustrate one example of an OFDM system through a block diagram.
Figure 11:
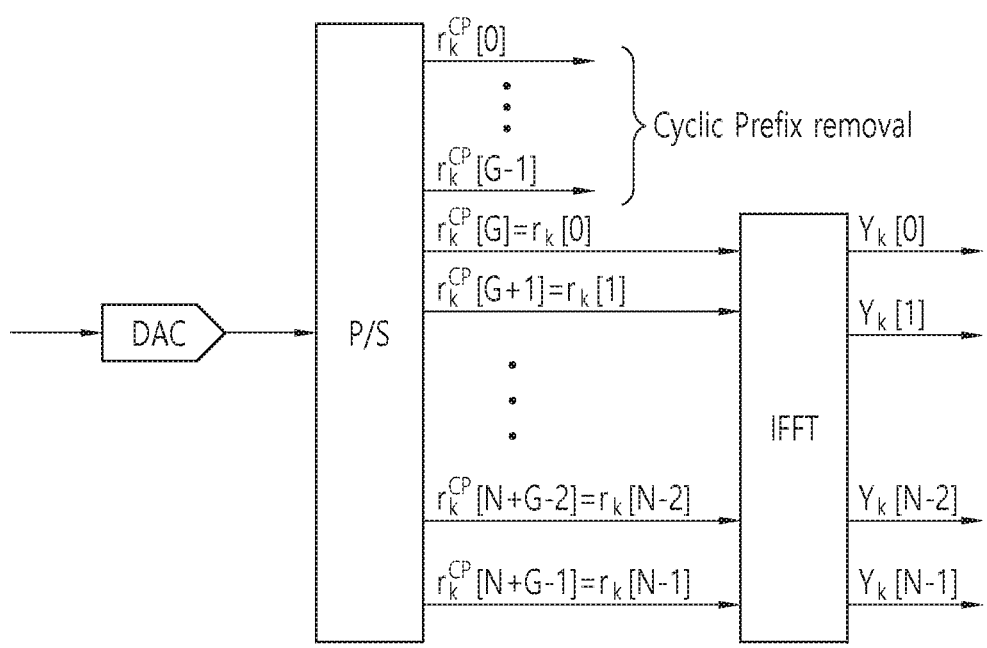

FIGS. 10 and 11 schematically illustrate one example of an OFDM system through a block diagram. Herein, FIG. 10 is a block diagram schematically illustrating one example of an OFDM transmitter and the OFDM transmitter may include a serial to parallel converter (S/P), an inverse fast fourier transform (IFFT)), a parallel to serial converter, and a DAC. FIG. 11 corresponds to a block diagram schematically illustrating an OFDM receiver and the OFDM receiver may include an ADC, an S/P, and a fast fourier transform (FFT).

In the OFDM systems, a signal to be transmitted is defined in the frequency domain. The serial to parallel converter may collect sequential data symbols as a data symbol $S_k=[S_k[0], S_k[1], \ldots, S_k[M-1]]^T$ having a degree of M and a subscript k may refer to an index of the OFDM symbol in a data block.

The M parallel data streams are first individually modulated as a complex vector $X_k=[X_k[0], X_k[1], \ldots, X_k[M-1]]^T$.

In principle, since a channel frequency is optional, different subcarriers may be subjected to different modulation (e.g., QPSK or 16QAM). In this case, a channel gain may be different for each subcarrier and some subcarriers may carry a higher data rate than other subcarriers.

Thereafter, the vector Xk of the data symbol passes through the IFFT, and as a result, N complex time domain samples $x_k=[x_k[0], \ldots, x_k[N-1]]^T$ are derived. In a realistic OFDM system, the number of processed subcarriers has a larger value than the number of modulated subcarriers (i.e., N≥M). In this case, unmodulated subcarriers are filled with zero.

Figure 12:
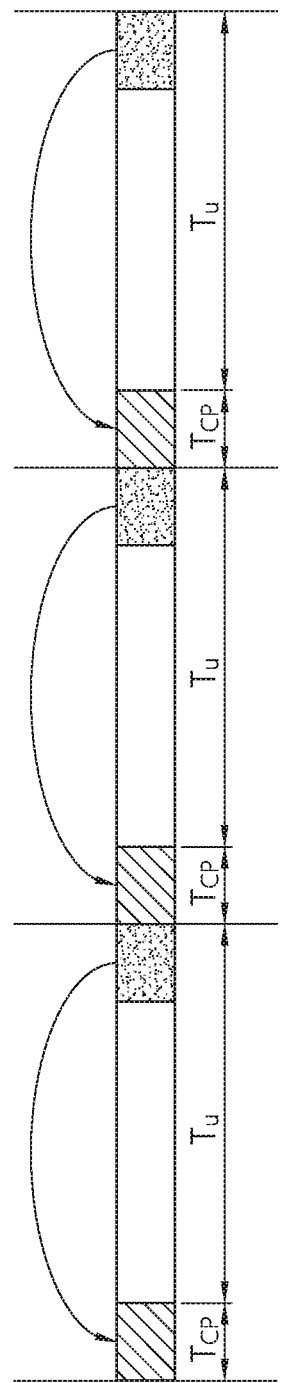
FIG. 12 schematically illustrates an input of an OFDM cycle prefix (CP).

FIG. 12 schematically illustrates an input of an OFDM cycle prefix (CP).

With respect to OFDM generation, a guard period may be inserted at each OFDM symbol start point to eliminate the influence of the residual ISI caused by multipath propagation. In this case, the guard period may be obtained by adding the cyclic prefix (CP) to the start point of the symbol $x_k$. The CP is generated by duplicating last G samples of the IFFT and is generated by appending the duplicated G samples to the starting point of $x_k$. This results in a time domain OFDM symbol $[x_k[N-G], \ldots, x_k[N-1], x_k[0], \ldots, x_k[N-1]]^T$.

To completely avoid the ISI, the CP length G needs to be chosen to be longer than a maximum supported channel impulse response. The CP may convert linear (i.e., aperiodic) convolutions of the channel into a cyclic (i.e., periodic) suitable for DFT processing.

Thereafter, an output of the IFFT is parallel-to-serial converted for transmission through a frequency selective channel.

The receiver performs an inverse process of the process for inverse modulation of an OFDM signal.

When the number of subcarriers N is designed with power 2, FFT execution of high efficiency may be used in order to return the transformed signal to the frequency domain. Of N parallel streams from the FFT, a modulated subset of M subcarriers may be selected and further processed by the receiver.

Hereinafter, an SC-FDMA principle will be described.

In theory, SC-FDMA may be generated in both a time domain and the frequency domain. Although the two techniques are functionally equivalent to each other, generation of the time domain may have lower frequency band efficiency due to the associated requirements (time domain) and filtering regarding the numbers of filter ramp up and ramp down times. However, hereinafter, the principle of the SC-FDMA may be applied to both the time domain and the frequency domain.

Figure 13:
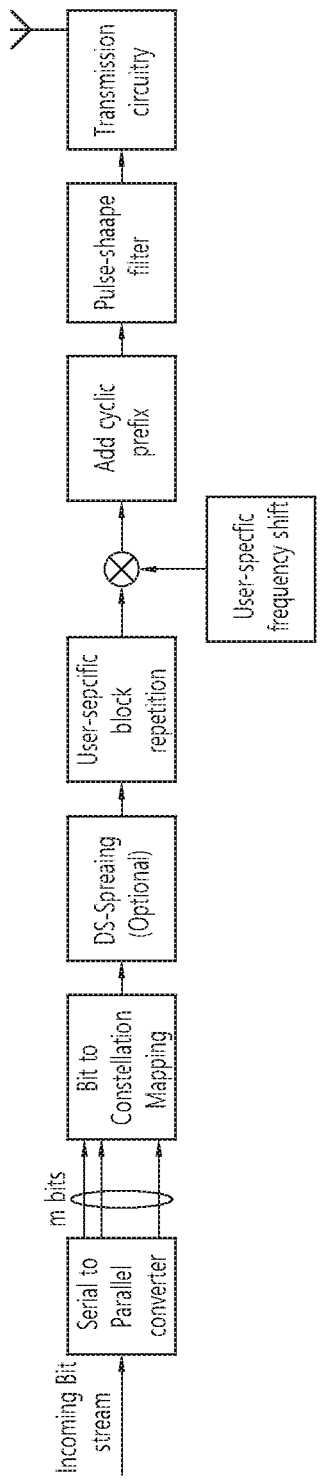
FIG. 13 corresponds to a block diagram schematically illustrating SC-FDMA time domain transmission processing.

FIG. 13 corresponds to a block diagram schematically illustrating SC-FDMA time domain transmission processing.

The time domain generation of an SC-FDMA signal may be illustrated as in FIG. 13. In this case, the time domain generation of the SC-FDMA signal may have a similar process to general single-carrier transmission.

An input bitstream may be mapped to a single carrier stream of QPSK or QAM symbols grouped as a symbol block of a length M. This may be followed by an optional repetition stage in which each block is repeated L times and followed by a user specific frequency shift by transmission of each user.

Here, the CP may be inserted and after filtering (e.g. filtering with a root-raised cosine pulse-shaping filter), a last signal may be transmitted.

Figure 14:
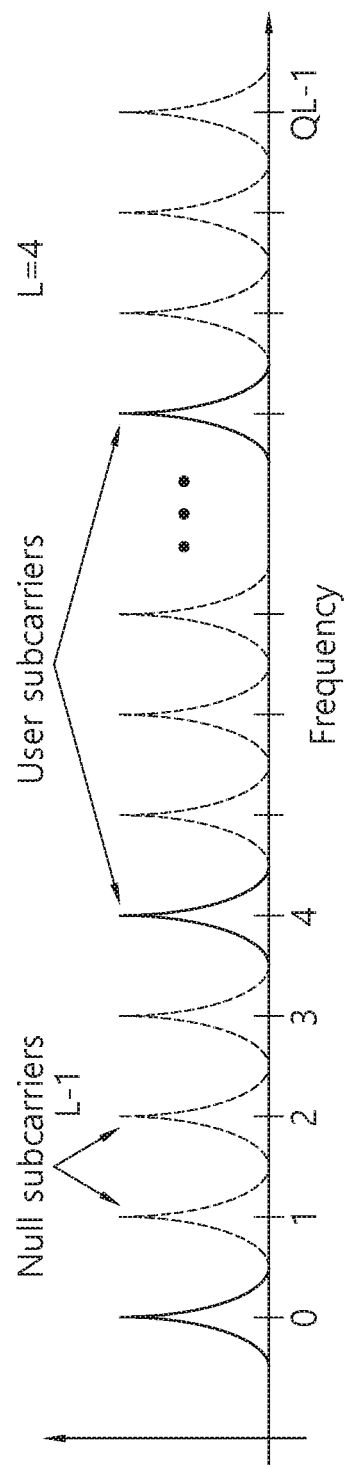
FIG. 14 schematically illustrates one example of equal-spacing distributed transmission between occupied subcarriers.

FIG. 14 schematically illustrates one example of equal-spacing distributed transmission between occupied subcarriers.

The symbol blocks have non-zero values only in a specific carrier frequency among the transmitted signals. That is, the transmitted signal may be distributed to have the non-zero values once every L periods. For example, as in the example of FIG. 14, when L is 4, non-zero subcarriers may appear for every four subcarriers.

Thus, a spectrum of the transmitted signal is similar to the data symbol modulated every L-th subcarrier of the OFDM signal. The occupation of the signal for every L-th subcarrier as described above may be referred to as 'distribution' and this corresponds to one method that provides a frequency diversity gain.

A varying block length 'M' and a repetitive factor 'L' may support a wide range of data rates under the constraint of the total number of occupied subcarriers possible in the frequency band (e.g., ML=constant).

If the symbol block repetition is not performed (i.e. L=0), the signal may occupy consecutive subcarriers and the transmission may be referred to as 'localized'. The localized transmission is advantageous for supporting frequency selective scheduling. For example, eNodeB may know an uplink channel condition due to a result of channel sounding or know intercell interference coordination.

When a set of successive subcarriers is hopped in the frequency domain, in particular, a time interval between hopping is shorter than duration for a block of channel coded data, the localized transmission may also provide frequency diversity.

Transmissions of different users using different repetition factors or frequency spacing maintain orthogonality and conditions that satisfy the orthogonality are as follows.

When the user occupies different sets of subcarriers. This may be achieved generally by user-specific frequency shifts (especially for local transmissions) or substantially by sorting interleaved sets of subcarriers (especially, in the case of distributed transmission) occupied by different users. Herein, the latter may be termed interleaved frequency division multiple access (IF-DMA).

The received signal is properly synchronized in time and frequency.

When the CP is longer than the sum of the channel delay spread and a time synchronization error residual.

The SC-FDMA time domain generated by the signal may have a similar level of cubic metric (CM)/peak to average power ratio (PAPR) as pulse-like single-carrier modulation. The ISI in the multipath channel may be protected by the CP and in this case, the CP enables efficient equalization with the aid of a frequency domain equalizer (FDE) on a receiver side.

Figure 15:
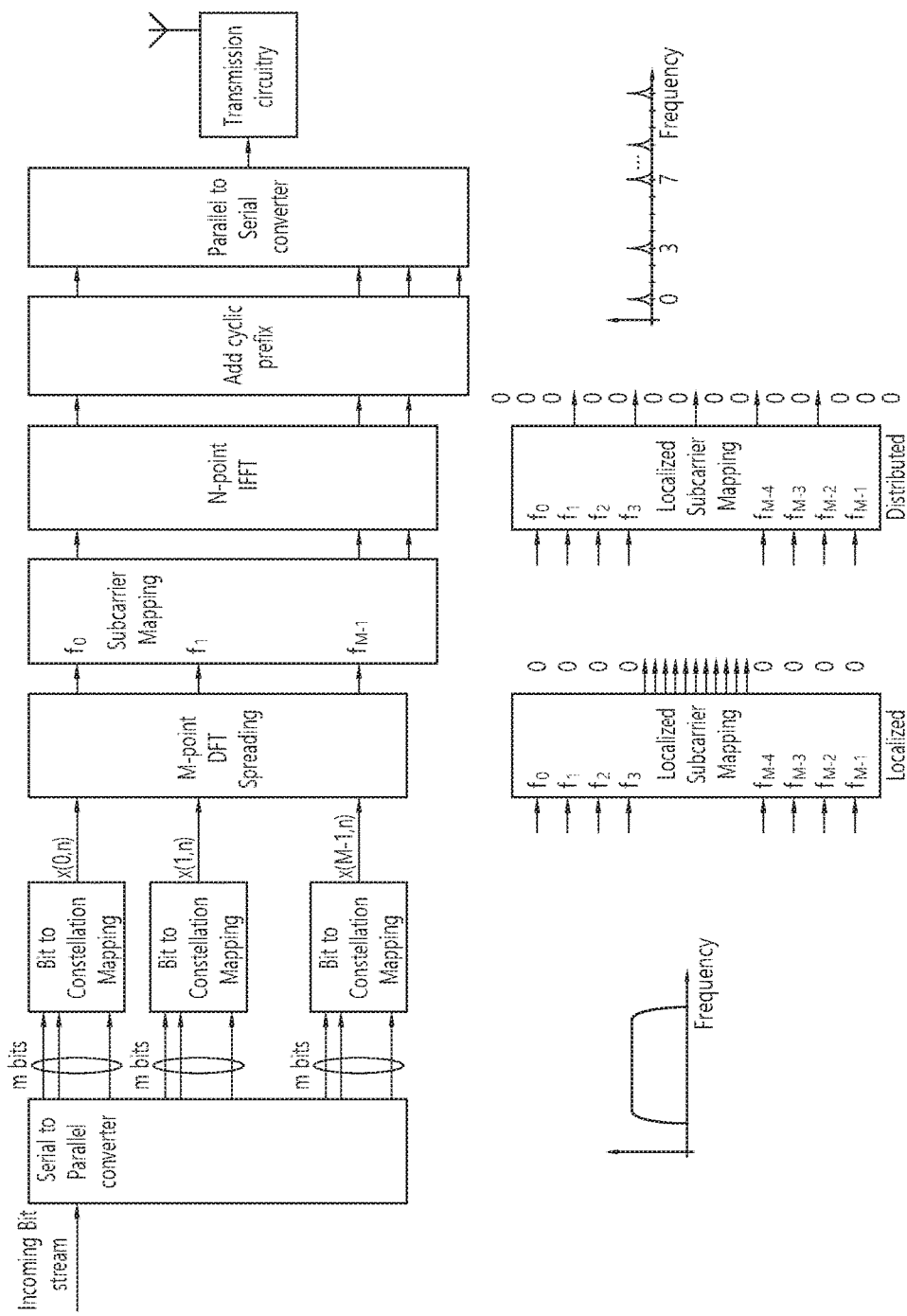
FIG. 15 is a block diagram schematically illustrating SC-FDMA frequency domain transmission processing through localized and distributed subcarrier mapping.

FIG. 15 is a block diagram schematically illustrating SC-FDMA frequency domain transmission processing through localized and distributed subcarrier mapping.

Referring to FIG. 15, the generation of the SC-FDMA in the frequency domain may be achieved by a discrete Fourier transform spread OFDM (DFT-S-OFDM) structure.

In a first stage of the DFT-S-OFDM, the SC-FDMA signal generation is to perform an M-point DFT operation on each block of M QAM data symbols. In addition, zeros are inserted into the outputs of the DFT to match the size of the DFT with N subcarrier OFDM modulators (in particular, IFFT). The DFT output inserted with 0 is mapped to N subcarriers.

In general, N is greater than the maximum number of occupied subcarriers, thus providing efficient oversampling and a 'sinc' (sin(x)/x) pulse shape. The equivalent and time-domain-generated SC-FDMA (SC-FDMA) transmission of the DFT-S-OFDM may be easily found when m=N. In this case, the DFT operation may remove the IFFT of the OFDM modulator from the results of the data symbols continuously transmitted in the time domain. However, such a simplified structure may not provide oversampling or pulse shape filtering.

With the time domain approach, the DFT-S-OFDM has a capability to generate both localized and distributed transmission.

Localized transmission: Through the subcarrier mapping, M contiguous subcarrier groups may be assigned to the user. In the case of M<N, the result of an unsampled/interpolated version of original M QAM data symbols may appear at the IFFT output of the OFDM modulator when 0 is added to the output of a DFT spreader. In this case, the transmitted signal is similar to a narrowband single carrier together with the CP (equivalent to generation of the time domain with repetition factor L=1) and sinc pulse shape filtering (cyclic filtering).

Localized transmission: Through the subcarrier mapping, M equally spaced subcarriers may be allocated (e.g., every L-th subcarrier). (L−1) zeros may be inserted between M DFT outputs and while the zeros inserted between the DFT outputs, such as the localization case described above generate waveform iterations in the time domain, additional 0 may be added to both sides of the DFT output prior to the IFFT (ML<N). This occurs in the transmitted signal similar to a time domain IFDMA together with the factor L and 'sinc' pulse shape filtering.

Like generation of the time domain SC-FDMA signal, orthogonality between different users with different data rate requirements, such as time domain SC-FDMA signal generation, may be achieved by placing a specific set of subcarriers for each user. The CP structure may be identical to the time domain signal generation, and the same efficient FDE technique may be applied to the receiver. In addition, any single matrix may be used at the location of the DFT for spreading operations.

Hereinafter, the present invention will be described.

In recent years, there has been a growing interest in device-to device (D2D) technology for direct communication between devices. In particular, the D2D has attracted attention as communication technology for a public safety network. Commercial communication networks are rapidly changing to LTE, but current public safety networks are mainly based on 2G technology in terms of conflicts with existing communication standards and cost. The technological gaps and demands for improved services have led to efforts to improve the public safety networks.

The public safety networks have higher service requirements (reliability and security) than the commercial communication networks and require direct signal transmission and reception, or D2D operation, between the devices, particularly when coverage of cellular communications is insufficient or unavailable.

A D2D operation can have various advantages in that the D2D operation is signal transmission/reception between neighboring devices. For example, a D2D terminal has high data rate and low latency and is capable of data communication. In addition, the D2D operation can distribute traffic which concentrates on a base station and can also serve to expand the coverage of the base station if the D2D terminal serves as a relay.

Vehicle-to-X (V2X) is a technology that exchanging useful information such as traffic conditions by continuously mutually communicating with a road infrastructure or other vehicles while vehicles travel by adding mobility to the D2D technology. In V2X networking, for example, in Vehicle-to-X (V2X), 'X' represents person (or UE) (V2P), vehicle (V2V), (UE type or eNB type) road side unit (RSU) or infrastructure (V2I) and vehicle-to-grid (V2G) may be soon added as another type of communication category in association with charging of an electric vehicle which has merged in recent years. In the present invention, 'ENTITY' may be interpreted as the same meaning as 'X'.

A UE (hereinafter referred to as a 'V2X UE' or 'UE' for easy description) using the V2X technology uses a higher frequency than the related art and performs wireless communication in a high-velocity situation due to mobility of a vehicle.

Herein, the fact that the UE, that is, the V2X UE performs the wireless communication at a high velocity means that the UE may be strongly influenced by a Doppler effect. For example, due to a velocity of the V2X UE, the Doppler effect such as a channel shift in a time axis may occur and as the velocity increases, the channel shift effect in the time axis may be larger.

Accordingly, the present invention provides a method for transmitting reliable information and an apparatus using the same, even though the V2X UE is affected by the Doppler effect, or the like through a TTI (or a subframe) structure robust to the Doppler effect, or the like.

The proposed methods below propose a method for efficiently transmitting vehicle-to-x (V2X) channel/signal(s) having different priorities (and/or quality-of-service/latency requirements). Hereinafter, for easy description of the proposed methods, the V2X channel/signal(s) (and/or V2X channel/signal) with a relatively high priority (and/or relatively high quality-of-service requirements and/or relatively short latency requirements) is referred to as "H_PRI_CH" and a V2X channel/signal(s) with a relatively low priority (and/or a relatively low quality-of-service requirement and/or a relatively long LATENCY requirement) is referred to as "L_PRI_CH".

Herein, as an example, a channel (and/or a channel through which V2X communication related system (/broadcasting) information is transmitted and/or a V2X communication related SYNCH. SIGNAL) in which control (/scheduling) information is transmitted is set to H_PRI_CH and a channel in which data information is transmitted may be set to L_PRI_CH.

Further, as an example, by applying the following proposed methods, when V2X communication is performed in a relatively high frequency band (e.g., 5.9 GHz) environment or a relatively high Doppler (/carrier frequency offset) environment), V2X channel/signal(s) of a (minimally) relatively high priority (and/or relatively high quality-of-service requirements and/or relatively short latency requirements) may be transmitted/received with high reliability.

In the present invention, as an example, the term "TTI" may be interpreted as a predefined (or signaled) number of symbol sets (smaller than a subframe (SF) unit) and the term "subcarrier" may be interpreted as a predefined (or signaled) number of RB sets (that are greater than subcarrier units).

In addition, although the proposed methods of the present invention are described in the V2X communication environment, this is only one application example and the following proposed methods (e.g., a method and an apparatus for selecting different (characteristic) TTIs according to the TTI and/or importance of information transmitted by the UE) may be applied to a D2D communication environment, a WAN DL/UL communication environment, and the like as well as the V2X communication environment. In this regard, as an example, "H_PRI_CH" may be extensively interpreted to a numerology related channel/signal having a relatively high priority (and/or the relatively high quality-of-service requirement and/or relatively short latency requirement) and further, "L_PRI_CH" may be (generally) extensively interpreted to a numerology related channel/signal having a relatively low priority (and/or the relatively low quality-of-service requirement and/or the relatively long LATENCY requirement).

Figure 16:
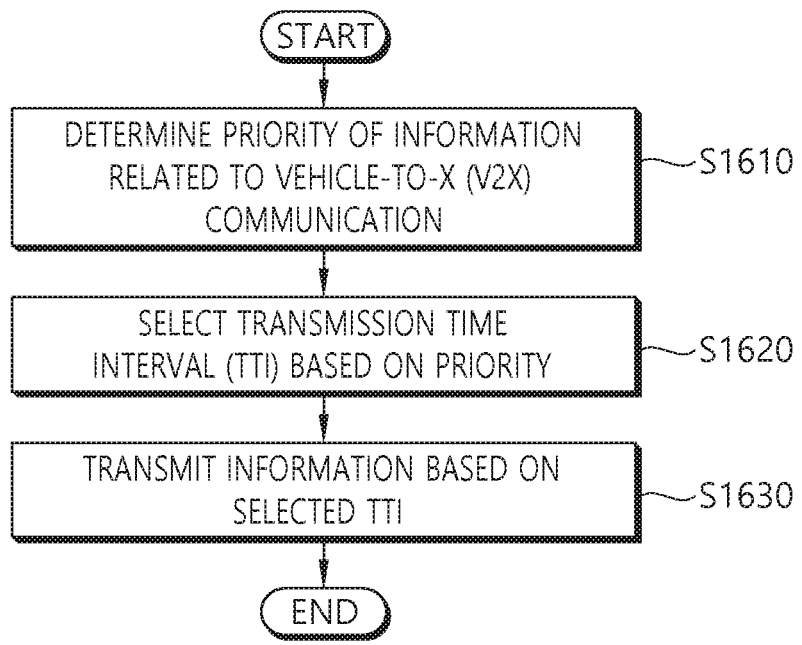
FIG. 16 is a flowchart of a method for performing V2X communication based on a transmit time interval (TTI) according to an embodiment of the present invention.

FIG. 16 is a flowchart of a method for performing V2X communication based on a transmit time interval (TTI) according to an embodiment of the present invention.

According to FIG. 16, the UE may determine the priority of information related to V2X communication (S1610). In this case, the details of the priority of the information related to the V2X communication will be described later.

The UE may select the TTI based on the priority (S1620). Herein, the TTI refers to a TTI which the UE uses for performing the V2X communication and information on the TTI (e.g., TTI selection information, information on a TTI to be used at the time of information having a high priority and/or a TTI to be used at the time of transmitting information having a low priority, ETC.) on the TTI may be preset in the UE or set by the network.

Herein, since information related to the control of V2X needs to be transmitted so as to have the high reliability, the UE according to the present invention may separately use a TTI determined to transmit the information (channel and/or signal) having the high reliability and a TTI determined to transmit information (channel and/or signal) of which reliability may not be relatively high.

That is, the TTI which the UE uses for performing the V2X communication may include a TTI in which a V2X channel/signal having the relatively high priority (i.e., the relatively high quality of service and/or the relatively short latency) and a TTI in which a V2X channel/signal having the relatively low priority (i.e., the relatively low quality of service and/or the relatively long latency). Herein, the TTI in which the V2X channel/signal having the relatively high priority is transmitted may be referred to as a 'first TTI' for easy description and a TTI in which the V2X channel/signal is transmitted may be referred to as a 'second TTI' for convenience of explanation for easy description.

Herein, when the terminal selects at least one TTI for the V2X communication, the UE may 1) select TTIs having different intervals according to the priority (for example, when the priority is high, select the first TTI constituted by a resource element which is long in frequency and short in time and when the priority is low, select the second TTI constituted by a resource element which is shorter in frequency and longer in time than the resource element in the first TTI) and/or 2) select a TTI in which 'zero' or 'null' is inserted into a specific subcarrier in a frequency resource domain in the TTI according to the priority (for example, when the priority is high, select the TTI into which zero or null inserted and when the priority is low, select a TTI into which zero or null is not inserted) and a detailed description thereof will be given later.

Thereafter, the UE may transmit the information based on the selected TTI (S1630).

Hereinafter, the TTIs will be described in more detail with reference to the drawings. In this case, the UE may perform the V2X communication using the TTI described later.

1. When the UE selects TTIs having different intervals (for example, selects the first TTI in case of the high priority and selects the second TTI in the case of the low priority) according to the priority, the TTIs selected by the UE may be as follows.

When the UE transmits the channel/signal having the high priority, the UE may select a TTI in which the high reliability is guaranteed. In this case, the TTI in which the high reliability is guaranteed may be constituted by a resource element (RE) which is short in a time axis and long in a frequency axis so as to have robustness to the Doppler effect that affects the UE.

Herein, the fact that the TTI is constituted by the resource element which is short in the time axis means that symbol duration is shortened in the time axis, so that there is almost no channel variation in one symbol. As a result, the TTI constituted by the resource element which is short in the time axis has robustness to the Doppler effect. Considering that frequency measurement at a high frequency has a large error, when the UE uses the TTI constituted by the resource element which is long in the frequency axis, it is advantageous that the UE measures a frequency offset due to extension of the frequency.

The TTI in which the information having the high reliability is transmitted and the TTI in which the information having the relatively low reliability is transmitted may be described as below.

Figure 17:
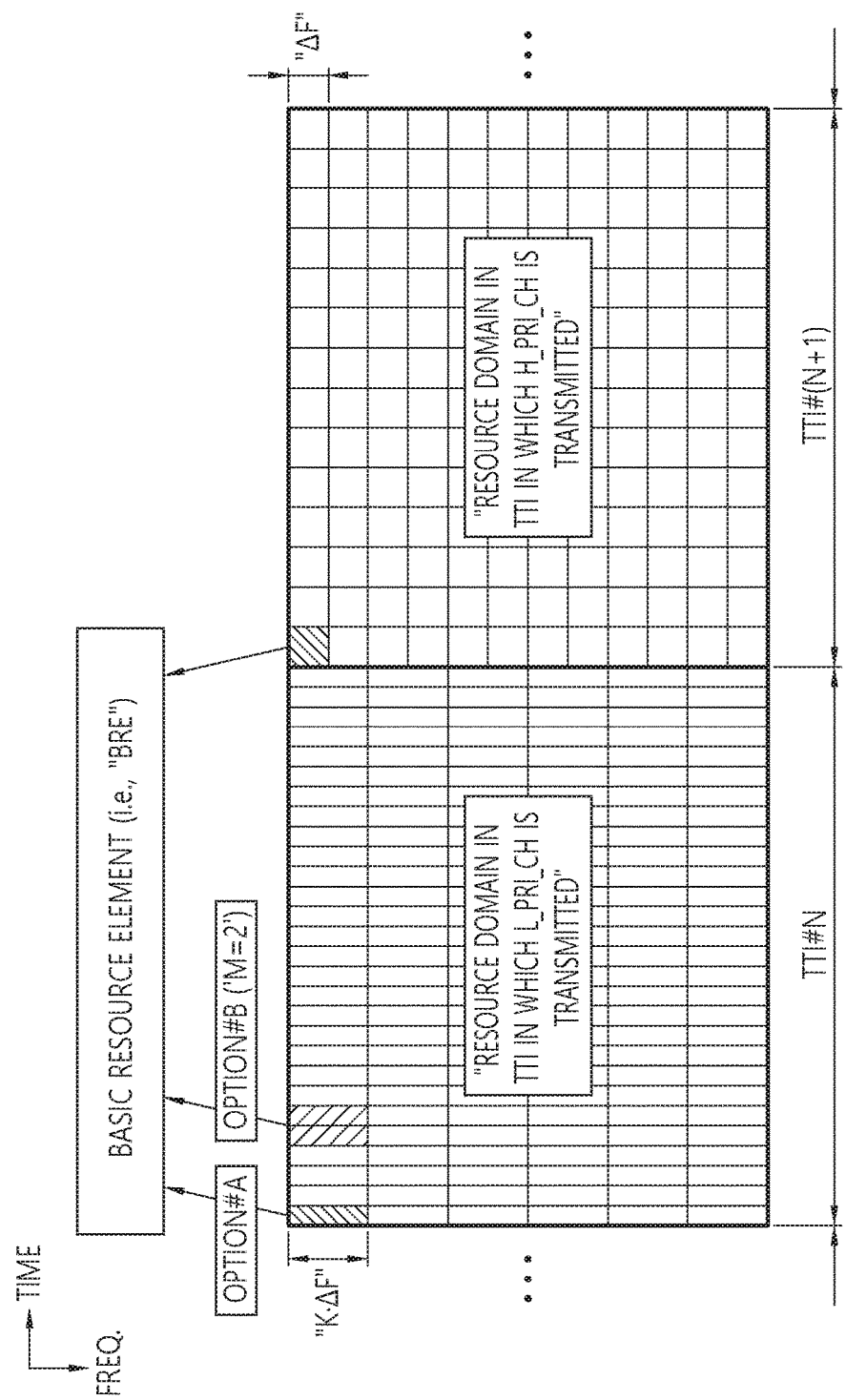
FIG. 17 schematically illustrates a TTI according to an embodiment of the present invention.

FIG. 17 schematically illustrates a TTI according to an embodiment of the present invention.

Referring to FIG. 17, the TTI used for transmitting the information having the high priority may be constituted by a resource element having a length which is K (K is an integer other than 0) times in terms of the frequency and a length which is 1/K times in terms of the time as large as the resource element in the TTI used for transmitting the information having the low priority. The resource element may mean a 'basic resource element'. In this case, the number of resource elements included in the TTI used for transmitting the information having the high priority may be equal to the number of resource elements included in the TTI used for transmitting the information having the low priority.

The embodiments of the present invention are not limited to those described above. That is, the length of the resource element in terms of the time, which is included in the TTI used for transmitting the information having the high priority may have a length M/K (M is a positive integer other than 0) times as large as the length of the resource element in terms of the time, which is included in the TTI used for transmitting the information having the low priority. When the resource element included in the TTI used for transmitting the information having the high priority has a length K times as large as the resource element included in the TTI used for transmitting the information having the low priority in terms of the frequency and both TTIs have the same length in terms of the time, a legacy UE may consider the TTI used for transmitting the information having the high priority as a TTI having interference similar to interference in the related art when looking at the TTI used for transmitting the information having the high priority. Accordingly, since the legacy UE may remove the interference by applying the technology in the related art, the efficiency of the entire wireless communication may increase.

More specifically,

[Proposed method #1] A rule may be defined so that subcarrier spacing of "K·$\Delta$F" (e.g., K is the positive integer other than 0) may be applied to a predefined (or signaled) (in-transmit time interval (TTI)) resource domain (in the transmit time interval (TTI)) in which H_PRI_CH is transmitted.

Here, as an example, "$\Delta$F" (e.g., 15 kHz) means the subscriber spacing applied to a predefined (or signaled) (in-TTI) (frequency) resource domain in which L_PRI_CH is transmitted.

As an example, the subscriber spacing applied to the predefined (or signaled) (in-TTI) (frequency) resource domain in which H_PRI_CH is transmitted may be set to a relatively larger value (than the subscribing spacing applied to the predefined (or signaled) (in-TTI) (frequency) resource domain), thereby ensuring high-reliability transmission/reception of H_PRI_CH.

Herein as an example, when such a rule is applied, the L_PRI_CH transmission may be interpreted as an increase in resource utilization efficiency rather than high-reliability transmission. FIG. 14 illustrates an example of a case in which [Proposed method #1] is applied.

Herein, as an example, it is assumed that a value of K is '2' and it is assumed that H_PRI_CH is transmitted in the resource domain within the TTI #N and L_PRI_CH is transmitted in the resource domain within the TTI #(N+1).

In addition, as an example, the basic resource element (BRE or a basic resource unit) on the TTI #N (and/or TTI #(N+1)) resource domain in which H_PRI_CH (and/or L_PRI_CH) is transmitted may be defined as OPTION #A or OPTION #B (i.e., a plurality of (M) BRE(s) based on OPTION #A is grouped to be defined as one BRE).

Herein, as an example, in FIG. 17, it may be interpreted that H_PRI_CH and L_PRI_CH are (TDM) transmitted through resource domains in different TTIs to which different (or independent) subscriber spacing is applied (or a resource pool in which H_PRI_CH is transmitted and a resource pool in which L_PRI_CH is transmitted is TDM (with different subcarrier spacing).

Further, as an example, in FIG. 17, TTI #N and TTI #(N+1) may be interpreted as SUB-TTI #1 and SUB-TT #2 belonging to one TTI (i.e., in one TTI, subcarrier spacing applied to a (frequency) resource domain in a predefined (or signaled) SUB-TTI in which H_PRI_CH is transmitted and subcarrier spacing applied to a (frequency) resource domain in a predefined (or signaled) SUB-TTI in which H_PRI_CH is transmitted may be interpreted to be different from each other).

In addition, as an example, due to one reason that the subcarrier spacing applied to the predefined (or signaled) (in-TTI) (frequency) resource domain in which the H_PRI_CH is transmitted is increased (or changed) and the subcarrier spacing applied to the predefined (or signaled)

(in-TTI) (frequency) resource domain in which L_PRI_CH is transmitted is not changed (or is maintained to be the same as the related art), a probability that L_PRI_CH (e.g., data channel) will occupy relative more resources (than H_PRI_CH (e.g., control channel)) (e.g., it may be interpreted that there is a high probability that interference will be given to cellular (UL) communication), and as a result, subcarrier spacing alignment (between the cellular (UL) communication and the V2X communication) may be needed in order to mitigate (or eliminate) interference between the cellular (UL) communication and the V2X communication.

FIGS. 18 to 22 schematically illustrate a TTI according to another embodiment of the present invention.

Referring to FIGS. 18 to 22, the information having the high priority may be redundantly mapped to the resource elements. That is, the information having the high priority may be repeatedly transmitted on the resource element of the TTI used for transmitting the information having the high priority. As a result, since the same data may be received twice by the UE receiving the data through the TTI, energy due to aggregation rises and the UE may receive the data better. Accordingly, the efficiency of the entire wireless communication increases.

In particular, when the same (encoded) bit(s) associated with H_PRI_CH is(are) repeatedly mapped (/transmitted) on contiguous symbol(s), the (associated) CP may be driven ahead of two symbol(s). That is, when the data is repeatedly transmitted on the time axis, the number of CPs which are redundantly transmitted may be reduced to one, so that the UE may transmit/receive data as much as regions with the reduced CPs.

More specifically,

[Proposal method #2] (When [Proposed method #1] above is applied) the rule may be defined so that the H_PRI_CH associated (encoded) bit(s) is(are) repeatedly transmitted (/mapped) in the predefined (or signaled) (in-TTI) resource domain in which H_PRI_CH is transmitted for a predefined (or signaled) number of times.

Figure 18:
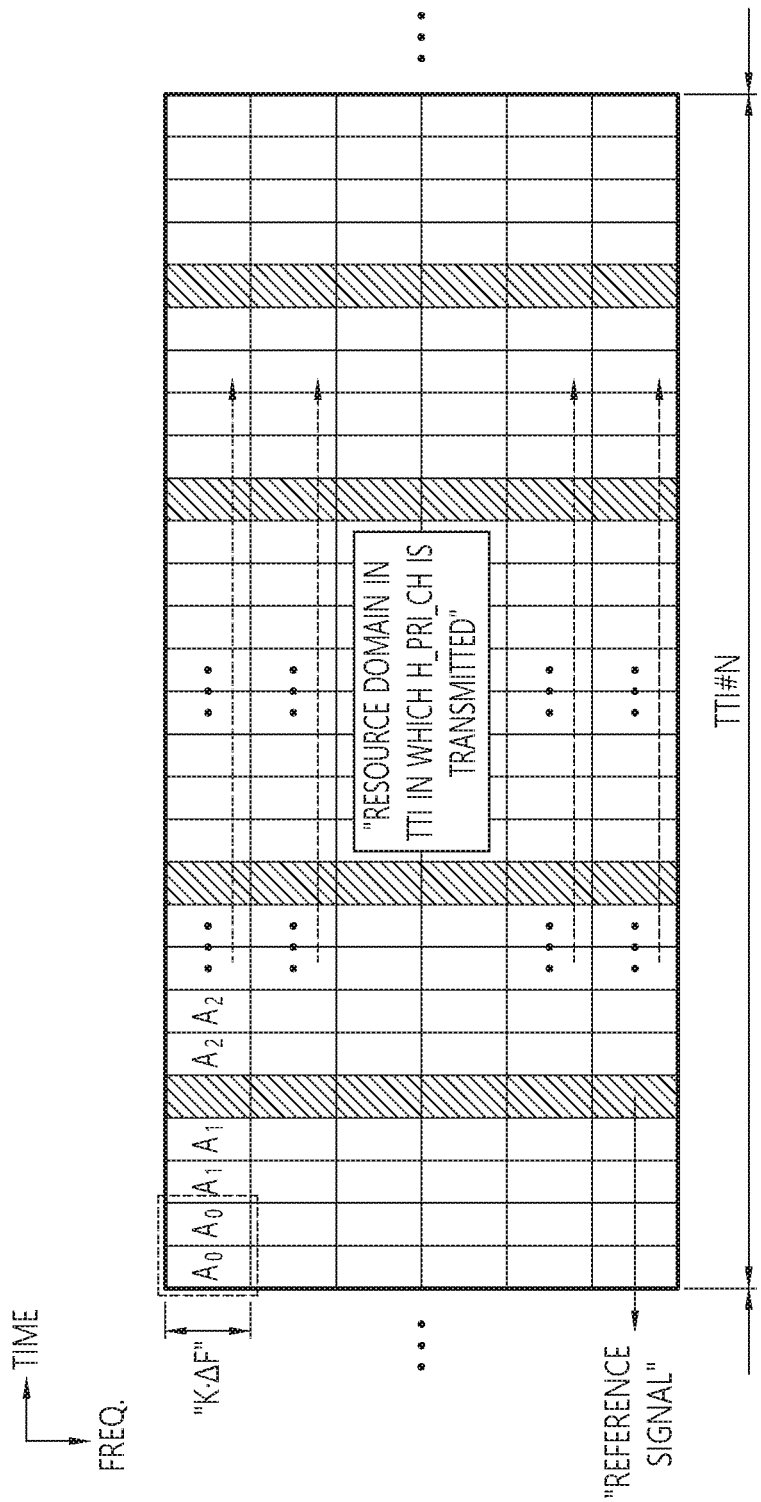
FIGS. 18 to 22 schematically illustrate a TTI according to another embodiment of the present invention.
Figure 19:
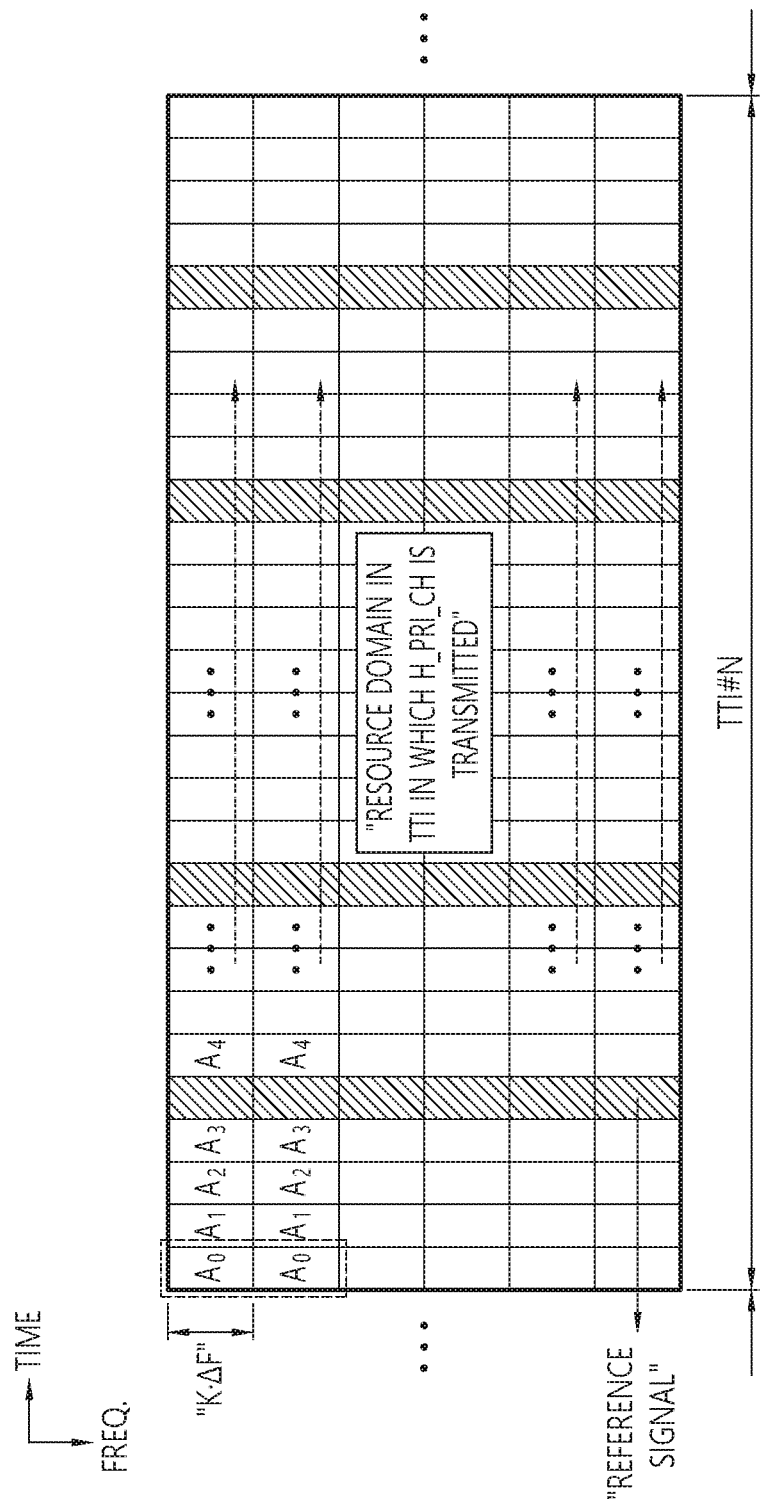

FIGS. 18 and 19 illustrate an example of a case in which [Proposed method #2] is applied.

Herein, as an example, a case where the H_PRI_CH associated (encoded) bit(s) is(are) constituted by "$A_0, A_1, A_2, \ldots, A_{(L-2)}, A_{(L-1)}$" is assumed and further, a situation in which the number of ((encoded) bit(s)) repetition transmission (/mapping) times is set to '2' is assumed.

Figure 20:
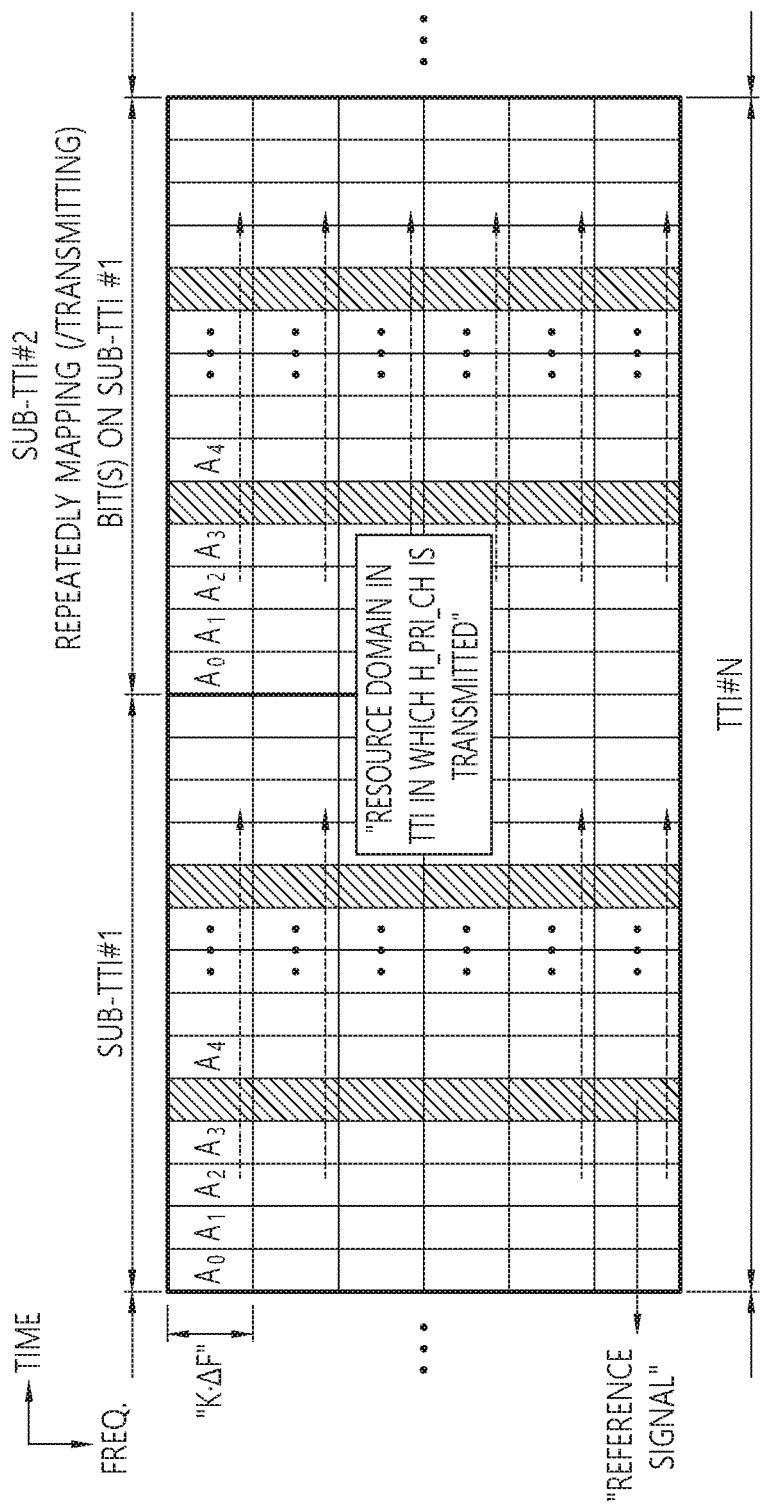

FIG. 20 illustrates an example of a rule of repeatedly transmitting (/mapping) H_PRI_CH associated (encoded) bit(s) onto a first USB-TTI onto remaining (Q−1) SUB-TTI(s) similarly after dividing (one) TTI #N into predefined (or signaled) Q SUB-TTI(s).

Herein, as an example, the application of such a rule may be interpreted that the H_PRI_CH associated (encoded) bit(s) is(are) repeatedly transmitted (/mapped) Q times.

In FIG. 20, as an example, a case where the value of Q is set to '2' and further, a case where the H_PRI_CH associated (encoded) bit(s) is(are) constituted by "$A_0, A_1, A_2, A_{(R-2)}, A_{(R-1)}$" (e.g., 'R=L/2') is assumed.

Figure 21:
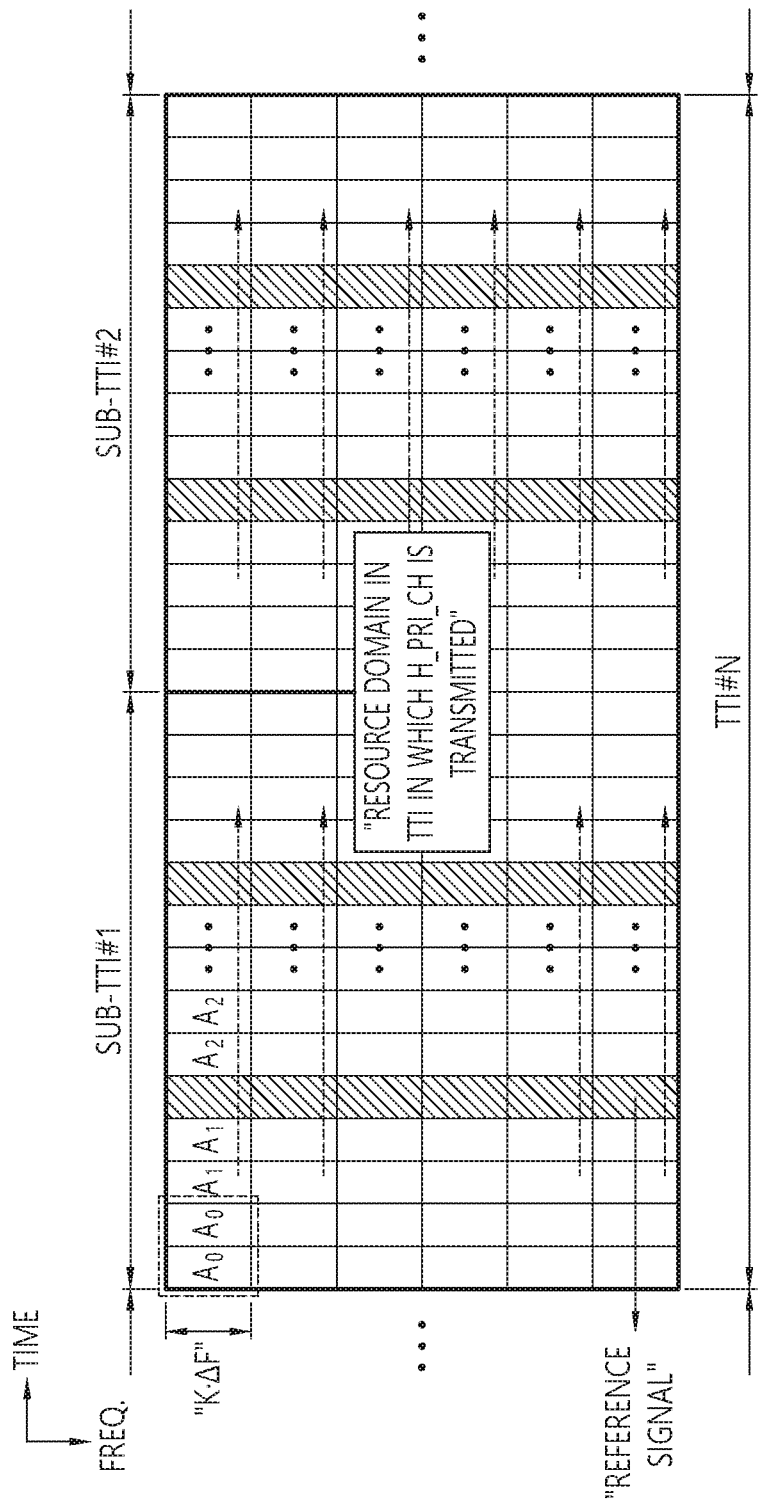
Figure 22:
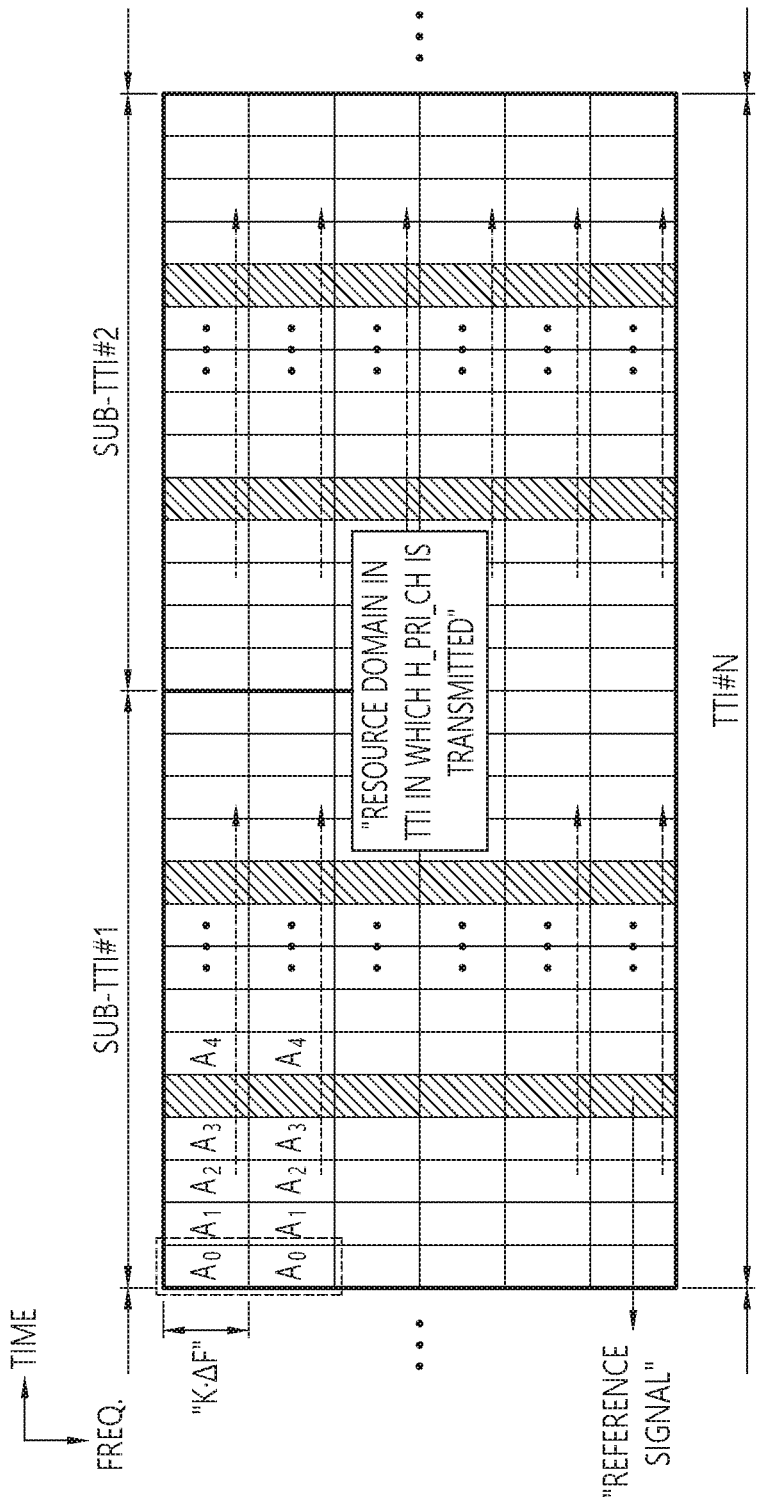

FIGS. 21 and 22 illustrate an example of a rule of repeatedly transmitting (/mapping) H_PRI_CH associated (encoded) bit(s) onto a first USB-TTI onto remaining (Q−1) SUB-TTI(s) sequentially from the first SUB-TTI after dividing (one) TTI #N into predefined (or signaled) Q SUB-TTI(s).

Herein, as an example, the case where the value of Q is set to '2' and further, the H_PRI_CH associated (encoded) bit(s) is(are) repeatedly transmitted (/mapped) twice.

Further, as an example, in FIGS. 21 and 22, the case where the H_PRI_CH associated (encoded) bit(s) is(are) constituted by "$A_0, A_1, A_2, \ldots, A_{(L-2)}, A_{(L-1)}$" is assumed.

In addition, in 18, 19, 20, 21, and 22, as an example, assumed is a case where the H_PRI_CH associated (encoded) bit(s) is(are) mapped (/transmitted) in a time-first order (/form) in a predefined (or signaled) (in-(SUB-) TTI) resource domain in which H_PRI_CH is transmitted.

Further, as an example, in FIGS. 18 and 21, the rule may be defined so that when the same (encoded) bit(s) associated with H_PRI_CH is(are) repeatedly mapped (/transmitted) on contiguous symbol(s), the (associated) CP may be driven ahead of two symbol(s).

As another example, [Proposed method #2] may be extensively applied even in order to transmit (/map) L_PRI_CH associated (encoded) bit(s) (when [Proposed method #1] described above is applied).

2. Hereinafter, a TTI in which 'zero' or 'null' is inserted into a specific subcarrier on the frequency resource domain will be described in detail.

FIGS. 23 to 29 schematically illustrate a TTI according to another embodiment of the present invention.

Referring to FIGS. 23 to 29, when 'zero' or 'null' is inserted into a specific subcarrier on the frequency resource domain in the TTI and the TTI is Fourier transformed, a resource domain into which 'zero' or 'null' is inserted and an adjacent resource domain (not 'zero' or 'null') become one set, and as a result, a phenomenon occurs, in which data of the adjacent resource domain is repeated the data of the adjacent resource area is repeated on the time axis. Accordingly, when 'zero' or 'null' is inserted in the specific subcarrier on the frequency resource domain of the TTI, the same data may be repeated on the time axis even though the interval of the TTI is not changed. Therefore, since the UE receiving the data through the TTI may receive the same data twice, energy due to aggregation is increased, and as a result, the UE may receive the data better. Accordingly, the efficiency of the entire wireless communication increases.

More specifically,

[Proposed method #3] The rule may be defined so that zero (or 'null') is inserted (/transmitted) into a specific subcarrier(s) on a predefined (or signaled) (in-(sub-)TTI) (frequency) resource domain in which H_PRI_CH is transmitted (i.e., shown as a (symbol) repetition effect in the time domain).

Herein, an example, the corresponding specific subcarrier(s) may be set as an odd (or even)-numbered subcarrier(s) (or a subcarrier(s) having an odd (or even) number on the predefined (or signaled) (in-(SUB-)TTI) (frequency) resource domain.

Figure 23:
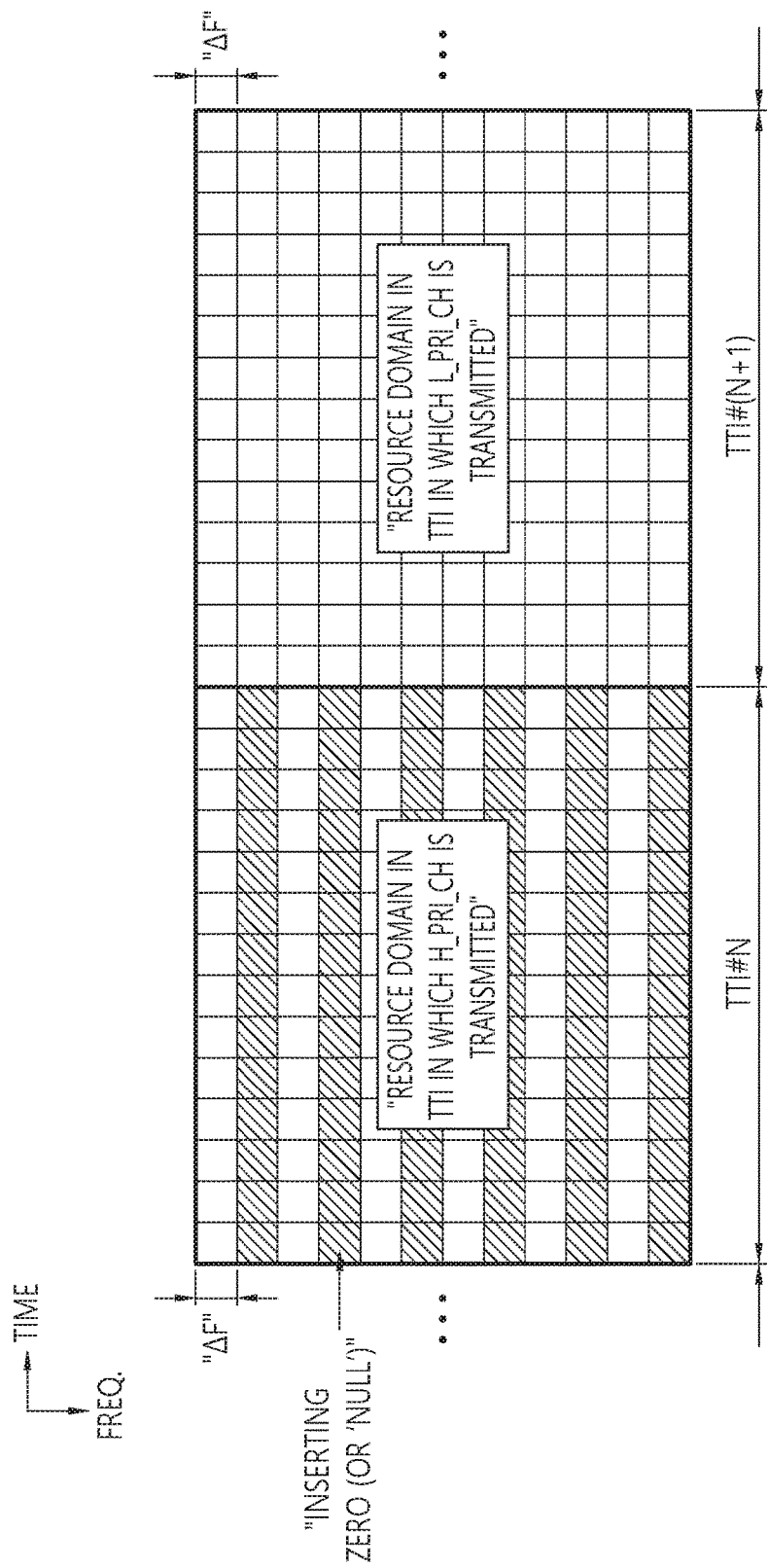
FIGS. 23 to 29 schematically illustrate a TTI according to another embodiment of the present invention.
Figure 24:
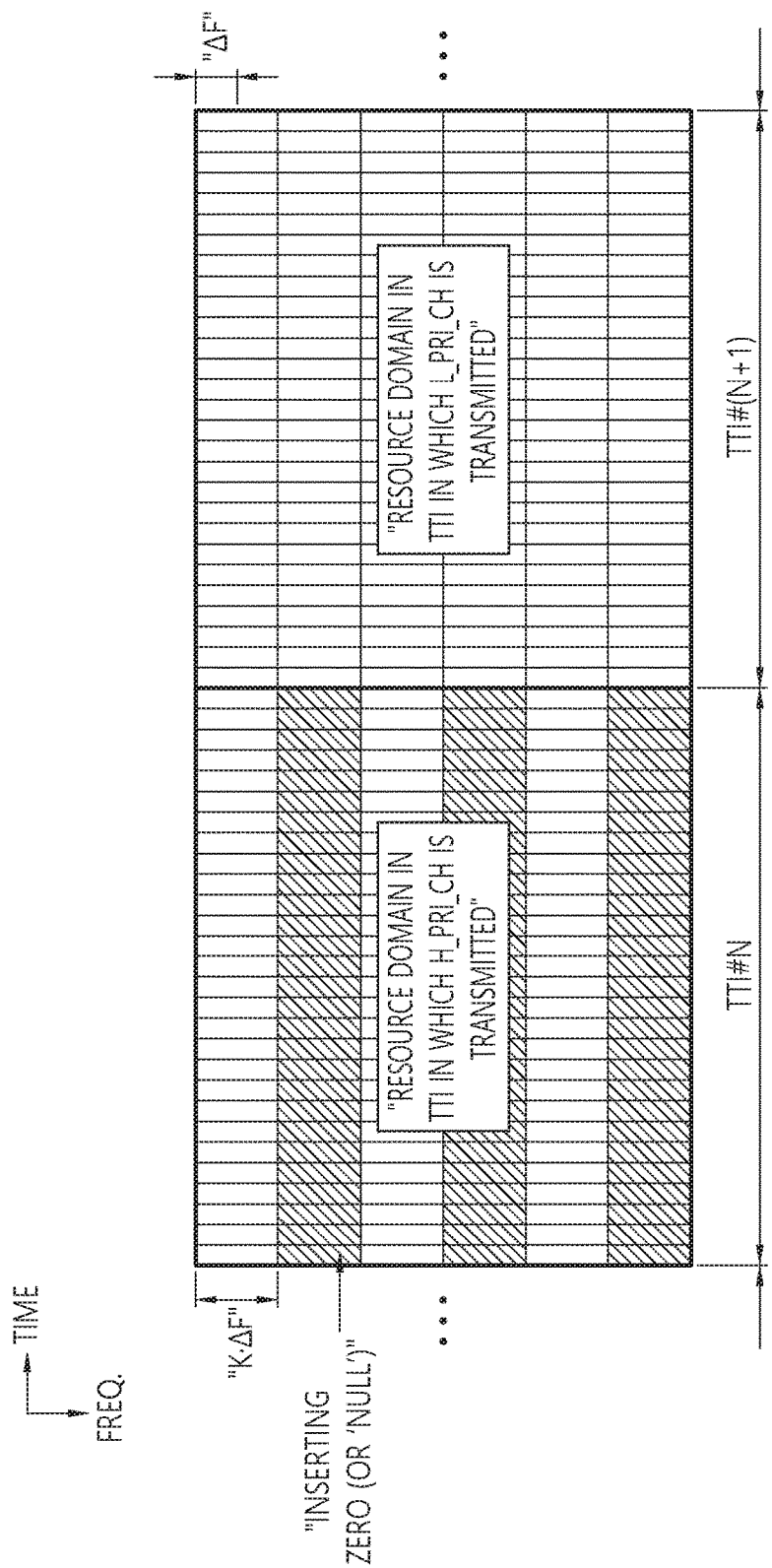

FIG. 23 and FIG. 24 illustrate an example of a case where [Proposed method #3] is applied (i.e., insertion of zero (or 'null') (/transmission) into the even numbered subcarrier(s)).

Herein, as an example, the subscriber spacing applied to the predefined (or signaled) (in-TTI) (frequency) resource domain in which H_PRI_CH is transmitted and the subscriber spacing applied to the predefined (or signaled) (in-(SUB-)TTI) (frequency) resource domain in which L_RPI_CH is transmitted are assumed to be the same as each other (i.e., "$\Delta F$", "$K \cdot \Delta F$" (e.g., K is the positive integer other than 0)).

Herein, as an example, FIG. 23 means that shows a case in which V2X channel/signal(s) (of a relatively high priority (and/or a relatively high quality-of-service requirement and/or a relative short latency requirement)) may robustly sent to a (relatively) high Doppler (/carrier frequency offset) without changing (or increasing) the subcarrier spacing (in the related art) (may be interpreted that a TX chain (in the related art)) under an environment of a relatively higher frequency band (e.g., 5.9 GHz) than the related art by applying the [Proposed method #3].

Figure 25:
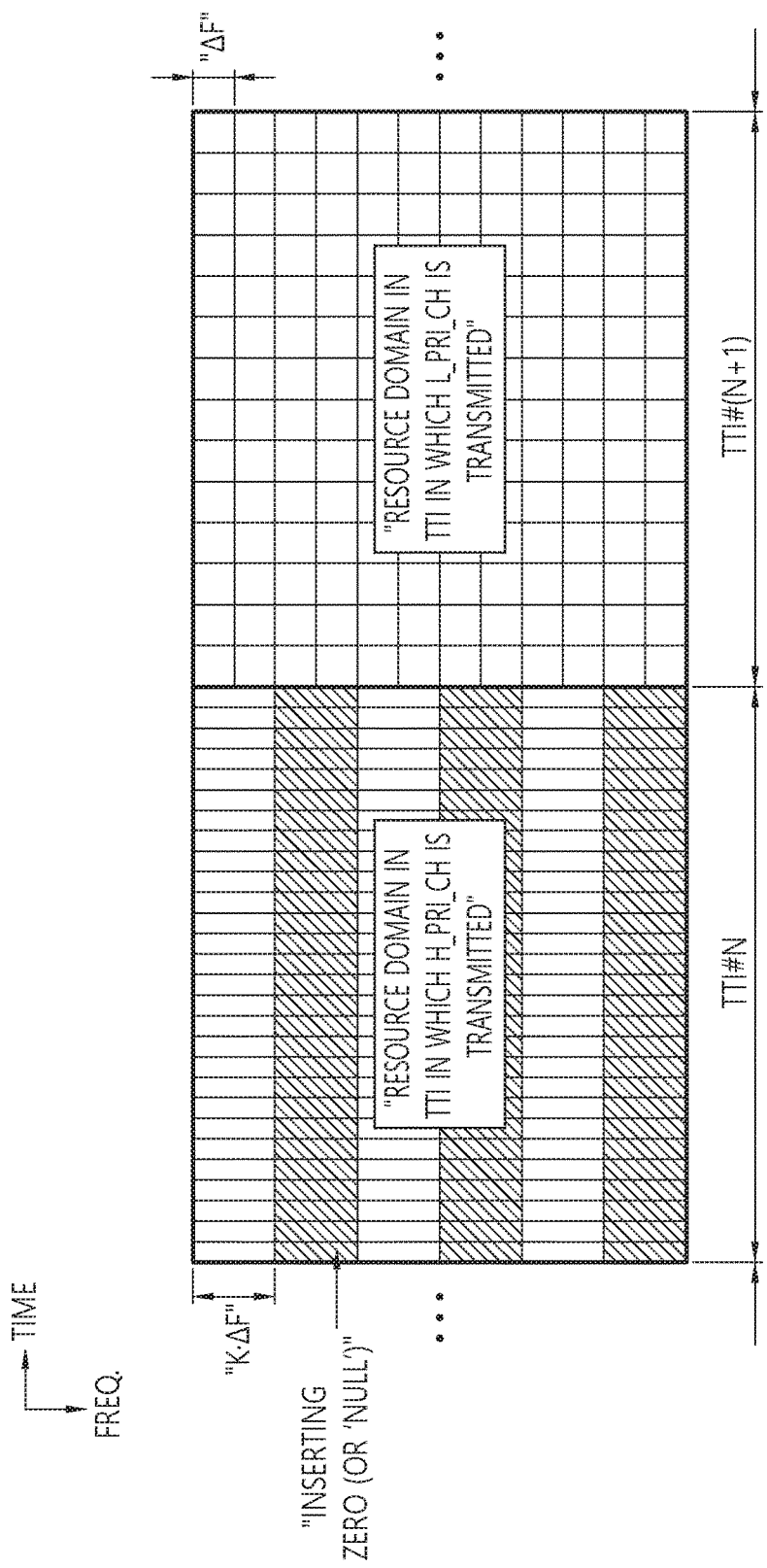

FIG. 25 illustrates another example of a case where [Proposed method #3] is applied (i.e., insertion of zero (or 'null') (/transmission) into the even numbered subcarrier(s)).

Herein, as an example, the subscriber spacing applied to the predefined (or signaled) (in-(sub-)TTI) (frequency) resource domain in which H_PRI_CH is transmitted is assumed as "K·ΔF" (e.g., K is the positive integer other than 0) and the subscriber spacing applied to the predefined (or signaled) (in-(SUB-)TTI) (frequency) resource domain in which L_RPI_CH is transmitted is assumed as "ΔF".

Further, as an example, in FIGS. 23, 24, and 25, TTI #N and TTI #(N+1) may be interpreted as SUB-TTI #1 and SUB-TT #2 belonging to one TTI (i.e., in one TTI, whether zero (or 'null') applied to a (frequency) resource domain in the predefined (or signaled) SUB-TTI in which H_PRI_CH is transmitted is inserted (/transmitted)/whether zero (or 'null') applied to the predefined (or signaled) in-SUB-TTI (frequency) resource domain in which L_PRI_CH is transmitted is inserted (/transmitted)/the subcarrier spacing value may be interpreted to be different from the subcarrier spacing).

As yet another example, [Proposed method #3] may be extensively applied even in order to transmit (/map) L_PRI_CH associated (encoded) bit(s).

[Proposed Method #4] When H_PRI_CH and L_PRI_CH are transmitted (and/or received) (or exist) on the (independently signaled (or set) (frequency) resource domain) within the same TTI, Proposed method #4 may be defined to be performed according to the following (some or all) rules.

Herein, as an example, H_PRI_CH may be designated as a channel (and/or a channel through which V2X communication related system (/broadcasting) information is transmitted and/or a V2X communication related SYNCH. SIGNAL) in which control (/scheduling) information is transmitted and L_PRI_CH may be designed as a channel in which data information is transmitted.

Example #1

Form in which zero (or 'null') is inserted (/transmitted) into a specific subscriber(s) on the predefined (or signaled) (frequency) resource domain in which H_PRI_CH is transmitted (i.e., [Proposed method #3] is applied), while zero (or 'null') is inserted (/transmitted) into the predefined (or signaled) (frequency) resource domain in which L_PRI_CH is transmitted, in the same TTI.

Figure 26:
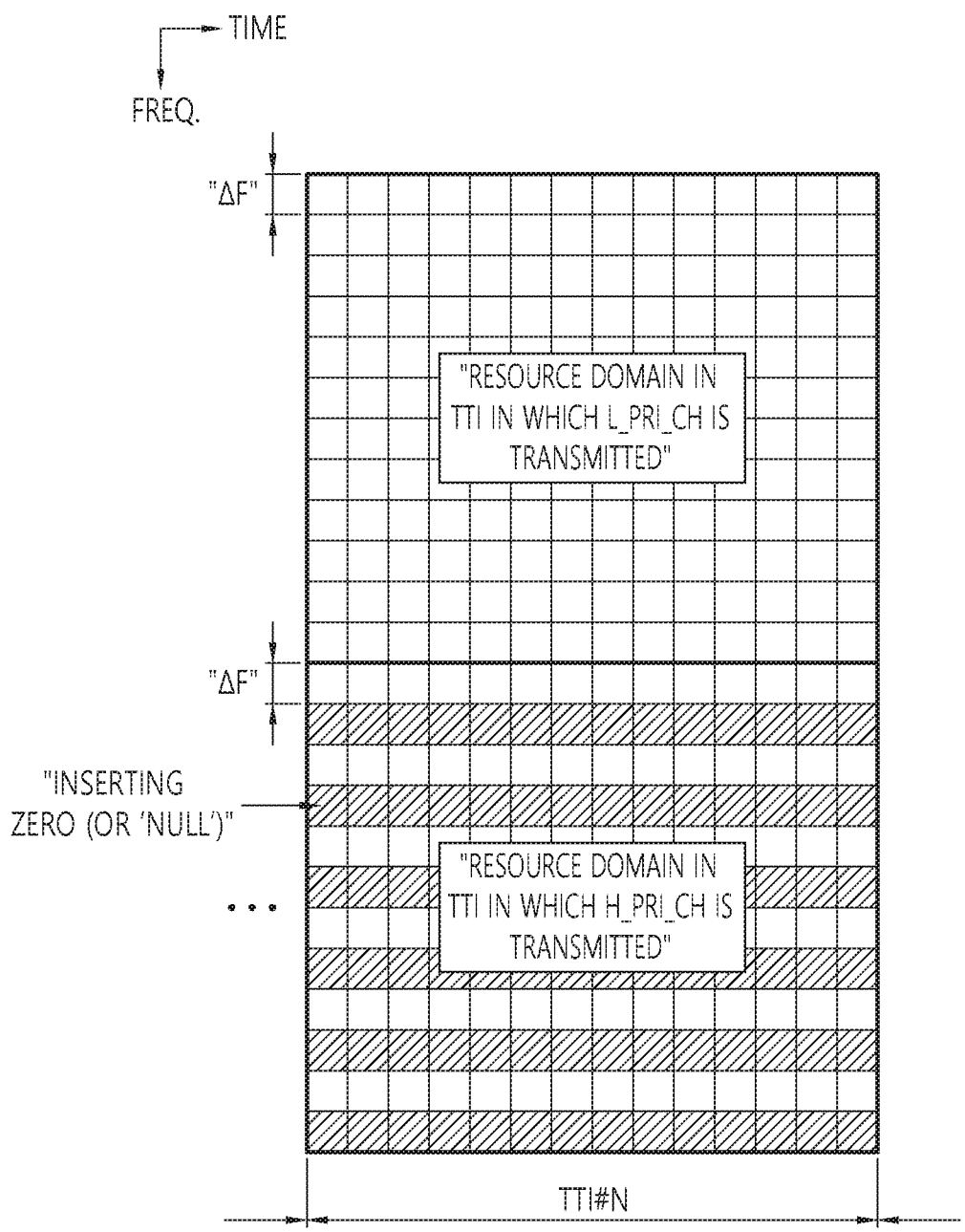
Figure 27:
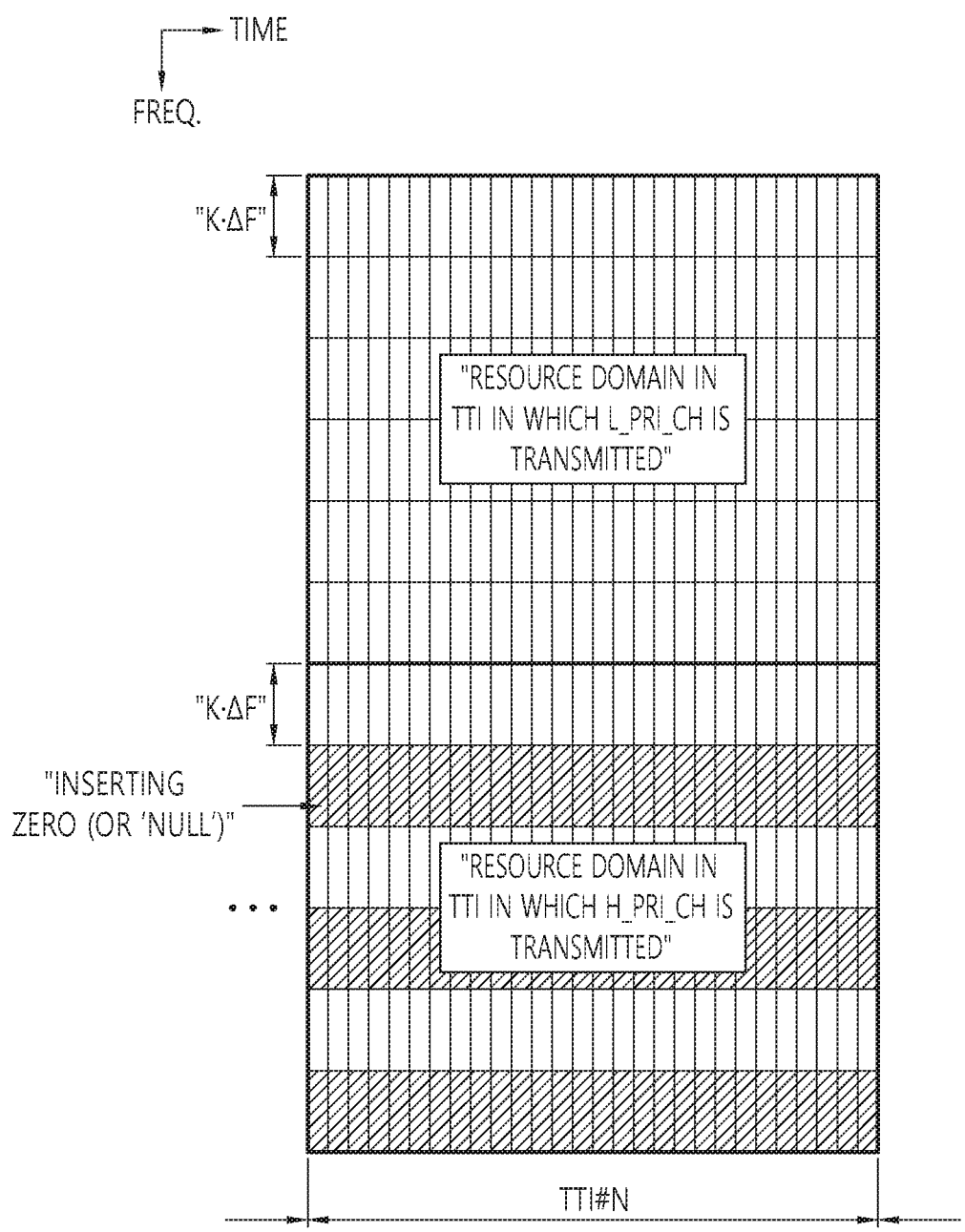

FIGS. 26 and 27 illustrate examples (i.e., zero (or 'null') is inserted (/transmitted) into the even-numbered subcarrier(s) on the predefined (or signaled) (frequency) resource domain in which H_PRI_CH is transmitted) of a case in which such a rule is applied. Herein, as an example, in FIGS. 26 and 27, the subscriber spacing applied to the predefined (or signaled) (frequency) resource domain in which H_PRI_CH is transmitted and the subscriber spacing applied to the predefined (or signaled) (frequency) resource domain in which L_RPI_CH is transmitted are assumed to be the same as each other (i.e., "ΔF", "K·ΔF" (e.g., K is the positive integer other than 0)).

Example #2

Form in which the subscriber spacing applied to the predefined (or signaled) (frequency) resource domain in which H_PRI_CH is transmitted is set as "K·ΔF" (e.g., K is the positive integer other than 0) (i.e., [Proposed method #1] is applied) and the subscriber spacing applied to the predefined (or signaled) (frequency) resource domain in which L_RPI_CH is transmitted is set as "ΔF".

Herein, as an example, when such a rule is applied, in order to mitigate the interference between the H_PRI_CH transmission/reception (frequency) resource domain and the L_PRI_CH transmission/reception (frequency) resource domain, additional guard band (or RB(s)) may be set between the H_PRI_CH transmission/reception (frequency) resource domain and the L_PRI_CH transmission/reception (frequency) resource domain.

Herein, as an example, the rule may be defined so that the eNB (or network or UE type or eNB type) RSU or V2X (RELAY) entity) notifies information on the corresponding guard band (or RB(s)) setting to V2X entity(s).

Further, as an example, when such a rule is applied, V2X TX ENTITY, which simultaneously transmits H_PRI_CH and L_PRI_CH through independent (or different) (frequency) resource domains within the same TTI, with different SUBCARRIER SPACING settings, applies independent IFFT to H_PRI_CH TX (related (frequency) resource domain) and L_PRI_CH TX (related (frequency) resource domain) (or within the same TTI, through different (frequency) resource regions with different SUBCARRIER SPACING settings, V2X RX ENTITY that simultaneously receives H_PRI_CH and L_PRI_CH (transmitted from the same (or different) V2S RX ENTITY) applies independent FFT to H_PRI_CH decoding (/reception) and L_PRI_CH decoding (/reception) through independent (or different) (frequency) resource domains in which different subcarrier spacing is set within the same TTI) (transmitted from the same (or different) V2X TX ENTITY) can apply an independent FFT to H_PRI_CH decoding (/receiving) and L_PRI_CH decoding (/receiving)).

Figure 28:
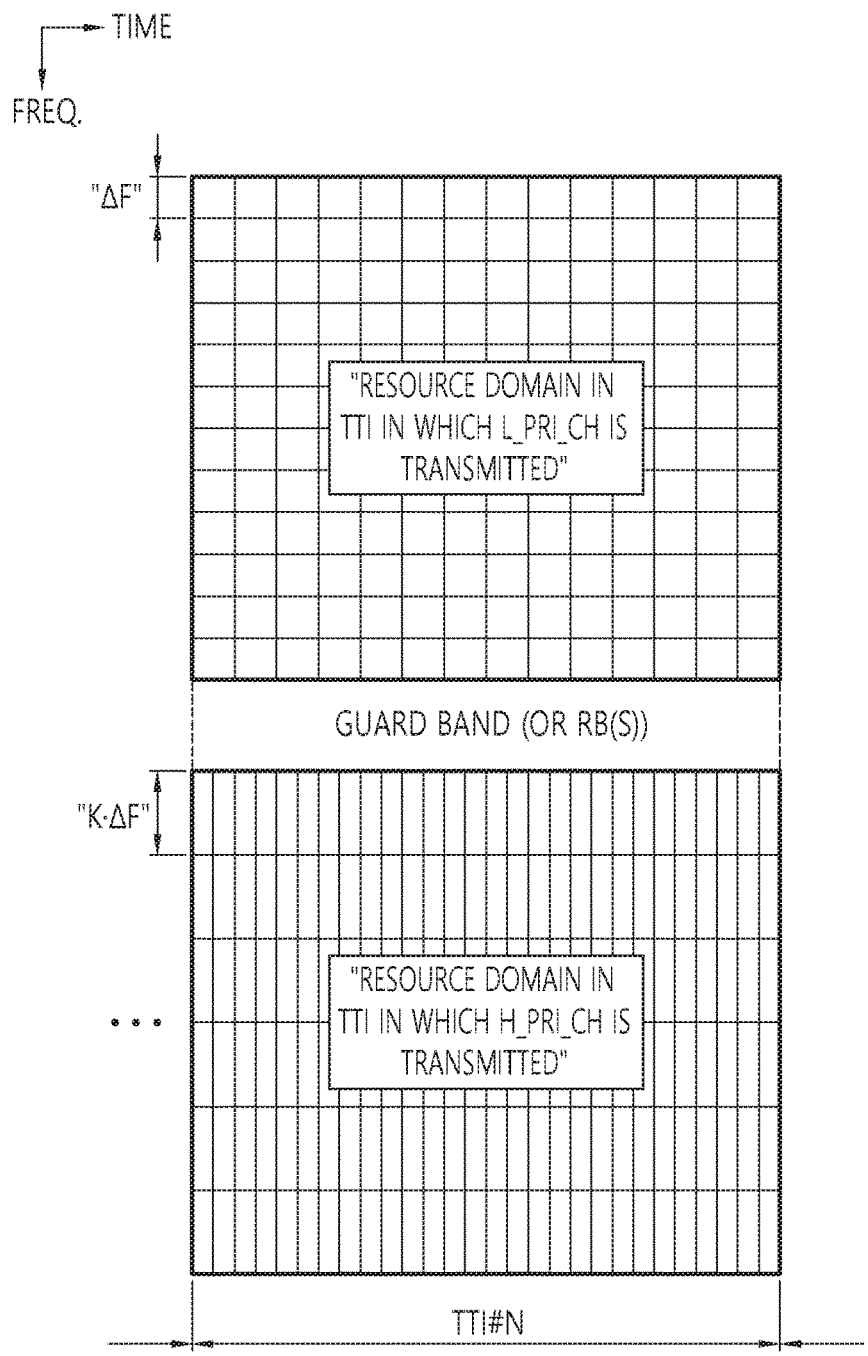
Figure 29:
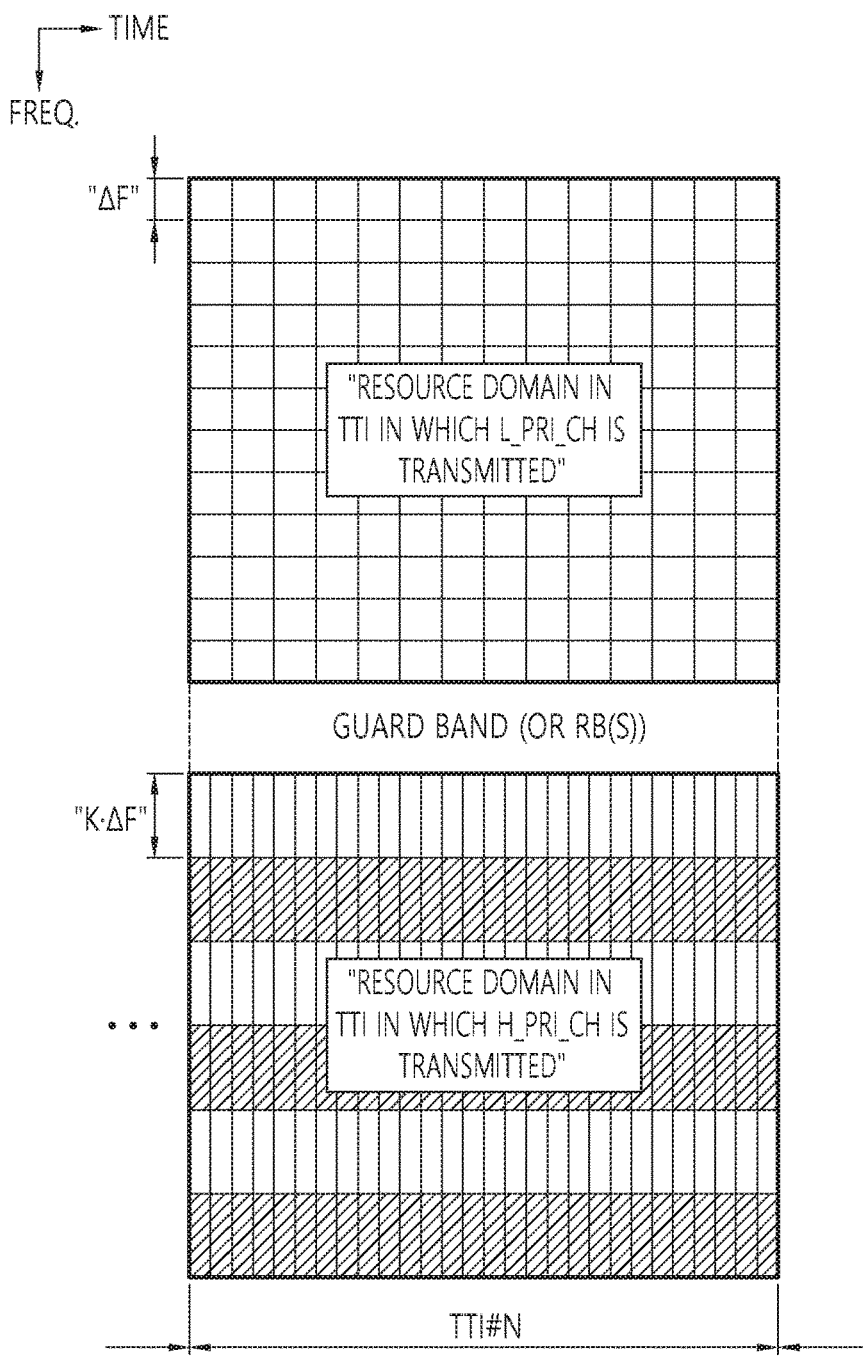

FIGS. 28 and 29 illustrate examples of the case where such a rule is applied.

Herein, as an example, in the case of FIG. 29, zero (or 'null') is inserted (/transmitted) into the even-numbered subcarrier(s) on the predefined (or signaled) (frequency) resource domain in which H_PRI_CH is transmitted (i.e., [Proposed method #3] is applied).

It is obvious that since the examples of the proposed method described above may also be included as one of implementing methods of the present invention, the examples may be regarded as a kind of proposed methods. Further, the proposed methods described above may be independently implemented, but implemented in combination (or merge) of some of the proposed methods.

For example, in the present invention, the proposed method based on the 3GPP LTE system has been described for easy description, but the scope of the system to which the proposed method is applied may be extended to other systems than the 3GPP LTE system.

As an example, the proposed methods of the present invention may be extended even for D2D communication. Herein, as an example, the D2D communication means that a UE communicates directly with another UE using a wireless channel. Herein, as an example, the UE refers to a user's terminal, but a network equipment such as a base station may also be regarded as a kind of UE when transmitting/receiving the signal according to a communication scheme between the UEs.

As an example, the rule may be defined so that the described proposed methods are limitedly applied only in an FDD system (and/or TDD system) environment.

As an example, the described proposed methods may used so as to efficiently (reliably) support respective communication related transmission/reception when communications with different NUMEROLOGY(S) (and/or different LATECY (/QOS) REQUIREMENT(S) and/or priorities) coexist (on one cell or system (band) (for example, different communications are set (/operated) for each subband)) coexist).

As an example, the rule may be defined so that the proposed methods described above are limitedly applied only to MODE 2 COMMUNICATION and/or TYPE 1 DISCOVERY (and/or MODE 1 COMMUNICATION and/or TYPE 2 DISCOVERY).

Further, as an example, the rule may be defined so that the proposed methods are limitedly applied only to IN-COVERAGE D2D UE (and/or OUT-COVERAGE D2D UE) (and/or RRC CONNECTED D2D UE (and/or RRC IDLE D2D UE) and/or RELAY D2D UE (and/or (REMOTE UE (which participates in RELAY communication))).

As an example, the rule may be defined so that the proposed methods are limitedly applied only to the D2D UE (and/or D2D UE performing only a D2D communication (transmission/reception) operation) that performs only a D2D discovery (transmission/reception) operation.

As an example, the rule may be defined so that the proposed methods are limitedly applied only in a scenario (and/or only the D2D communication is supported (configured)) in which only the D2D discovery is supported (configured).

As an example, the rule may be defined so that the proposed methods are limitedly applied only in a case where a D2D discovery signal receiving operation in another (UL) carrier on an inter-frequency is performed (and/or a case where the D2D discovery signal receiving operation in another inter-PLMN based PLMN (UL) carrier) is performed.

In addition, as an example, the rule may be defined so that the proposed methods are limitedly applied only to the case where the V2X communication is performed under a relatively higher frequency band (e.g., 5.9 GHz) environment (and/or a relatively higher DOPPLER (/CARRIER FREQUENCY OFFSET) environment).

Figure 30:
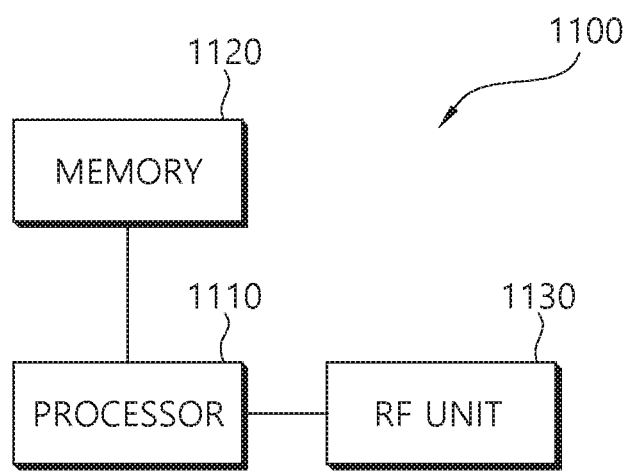
FIG. 30 is a block diagram illustrating a UE in which the embodiment of the present invention is implemented.

FIG. 30 is a block diagram illustrating a UE in which the embodiment of the present invention is implemented.

Referring to FIG. 30, the UE 1100 includes a processor 1110, a memory 1120, and a radio frequency (RF) unit 1130. The processor 1110 implements a function, a process, and/or a method which are proposed. For example, the processor 1110 may select at least one TTI for V2X communication and the processor 1110 may perform the V2X communication based on the selected at least one TTI via the RF unit 1130.

The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for transmitting information related to a vehicle-to-X (V2X) communication in a wireless communication system, the method performed by a user equipment (UE) and comprising:
    determining a priority of the information related to the V2X communication;
    selecting a transmission time interval (TTI) based on the priority; and
    transmitting the information related to the V2X communication based on the selected TTI,
    wherein, when the information related to the V2X communication is information having a high priority, a first TTI is selected,
    wherein, when the information related to the V2X communication is information having a lower priority than the information having the high priority, a second TTI is selected,
    wherein a resource element of the first TTI is K times longer than a resource element of the second TTI in terms of a frequency, and
    wherein the resource element of the first TTI is 1/K times shorter than the resource element of the second TTI in terms of a time,
    where K is a positive integer other than 0.

2. The method of claim 1, wherein data is repeatedly allocated to the resource element of the first TTI.

3. The method of claim 1, wherein zero or null is allocated to a specific subcarrier in a frequency domain of the first TTI.

4. The method of claim 3, wherein the specific subcarrier to which the zero or null is allocated is positioned alternatively with a subcarrier to which information is allocated in the frequency domain.

5. The method of claim 3, wherein the resource element of the first TTI is longer than the resource element of the second TTI in terms of the frequency.

6. The method of claim 5, wherein the resource element of the first TTI is shorter than the resource element of the second TTI in terms of the time.

7. The method of claim 3, wherein a guard area is positioned between the first TTI and the second TTI.

8. The method of claim 7, wherein the guard area is positioned on the frequency domain between the first TTI and the second TTI.

9. The method of claim 1, wherein the information having the high priority is control information, and
    the information having the low priority is data information.

10. The method of claim 1, wherein information regarding a configuration of the at least one TTI is preconfigured in the UE.

11. A user equipment (UE) comprising:
    a transceiver configured to transmit and receive a radio signal; and
    a processor operated in association with the transceiver,
    wherein the processor is configured to:
        determine a priority of information related to a vehicle-to-X (V2X) communication,
        select a transmission time interval (TTI) based on the priority, and
        control the transceiver to transmit the information related to the V2X communication based on the selected TTI, wherein, when the information related to the V2X communication is information having a high priority, a first TTI is selected, wherein, when the information related to the V2X communication is information having a lower priority than the information having the high priority, a second TTI is selected, wherein a resource element of the first TTI is K times longer than a resource element of the second TTI in terms of a frequency, and wherein the resource element of the first TTI is 1/K times shorter than the resource element of the second TTI in terms of a time, where K is a positive integer other than 0.

* * * * *